LINE SEQUENTIAL COLOR TELEVISION APPARATUS

Filed March 14, 1950 8 Sheets-Sheet 1

INVENTORS
George E. Sleeper, Jr.,
Robert J. Stahl, and
C. Frederick Wolcott

BY Lippincott & Smith,
ATTORNEYS

PATTERN WITH ZERO SHIFT

Fig. 3.

| LINE | FIELD → | | | | | | |
|---|---|---|---|---|---|---|---|
| ↓ | I | II | III | IV | V | VI | VII |
| 1 | R | | R | | R | | R |
| 2 | | B | | B | | B | |
| 3 | G | | G | | G | | G |
| 4 | | R | | R | | R | |
| 5 | B | | B | | B | | B |
| 6 | | G | | G | | G | |
| 7 | R | | R | | R | | R |

PATTERN WITH SINGLE SHIFT

Fig. 4.

| LINE | FIELD → | | | | | | |
|---|---|---|---|---|---|---|---|
| ↓ | I | II | III | IV | V | VI | VII |
| 1 | R | | G | | R | | G |
| 2 | | B | | R | | B | |
| 3 | G | | B | | G | | B |
| 4 | | R | | G | | R | |
| 5 | B | | R | | B | | R |
| 6 | | G | | B | | G | |
| 7 | R | | G | | R | | G |

PATTERN WITH DOUBLE SHIFT

Fig. 5.

| LINE | FIELD → | | | | | | |
|---|---|---|---|---|---|---|---|
| ↓ | I | II | III | IV | V | VI | VII |
| 1 | R | | G | | B | | R |
| 2 | | G | | R | | B | |
| 3 | G | | B | | R | | G |
| 4 | | B | | G | | R | |
| 5 | B | | R | | G | | B |
| 6 | | R | | B | | G | |
| 7 | R | | G | | B | | R |

INVENTORS
George E. Sleeper, Jr.,
Robert J. Stahl and
C. Frederick Wolcott
BY Lippincott & Smith
ATTORNEYS INVENTORS
George E. Sleeper, Jr.,
Robert J. Stahl, and
C. Frederick Wolcott
BY Lippincott & Smith
ATTORNEYS

LINE SEQUENTIAL COLOR TELEVISION APPARATUS

INVENTORS
George E. Sleeper, Jr.,
Robert J. Stahl, and
C. Frederick Wolcott
BY Lippincott & Smith,
ATTORNEYS March 20, 1956 G. E. SLEEPER, JR., ET AL 2,739,181

LINE SEQUENTIAL COLOR TELEVISION APPARATUS

Filed March 14, 1950 8 Sheets-Sheet 5

INVENTORS
George E. Sleeper, Jr.,
Robert J. Stahl, and
C. Frederick Wolcott

BY Lippincott & Smith
ATTORNEYS

LINE SEQUENTIAL COLOR TELEVISION APPARATUS

Filed March 14, 1950 8 Sheets-Sheet 6

INVENTORS
George E. Sleeper, Jr.,
Robert J. Stahl & C. Frederick Wolcott
BY Lippincott & Smith
ATTORNEYS

LINE SEQUENTIAL COLOR TELEVISION APPARATUS

INVENTORS
George E. Sleeper, Jr.,
Robert J. Stahl, and
C. Frederick Wolcott
BY Lippincott & Smith
ATTORNEYS March 20, 1956 G. E. SLEEPER, JR., ET AL 2,739,181

LINE SEQUENTIAL COLOR TELEVISION APPARATUS

Filed March 14, 1950 8 Sheets-Sheet 8

INVENTORS
George E. Sleeper, Jr.,
Robert J. Stahl, and
C. Frederick Wolcott

BY

Lippincott & Smith
ATTORNEYS

United States Patent Office 2,739,181

Patented Mar. 20, 1956

2,739,181

LINE SEQUENTIAL COLOR TELEVISION APPARATUS

George E. Sleeper, Jr., Berkeley, Robert J. Stahl, Redwood City, and Carl Frederick Wolcott, Beverly Hills, Calif., assignors to Color Television Incorporated, San Francisco, Calif., a corporation of California Application March 14, 1950, Serial No. 149,577

14 Claims. (Cl. 178—5.2)

This invention relates to television apparatus. It is particularly concerned with television apparatus of the additive polychrome variety. Use is made of additive tricolor principles for analyzing varying subjects at transmission points and for re-creating from the thereby developed signals polychrome representations, such as tricolor images, at points of reception.

The now abandoned U. S. patent application of George E. Sleeper, Jr., Serial No. 121,861, filed October 17, 1949, for an invention entitled "Multicolor Television," has set forth a proposal of television apparatus usable for the transmission and reception of color television image signals. This system operates in accordance with line-sequential principles. The aforesaid patent application made clear the fact that the principles upon which line-sequential operations are controlled may apply generally also to other forms of transmissions and reception when line color shift is used.

It is also disclosed in the aforesaid U. S. patent application that television apparatus functioning under the heretofore known so-called line-sequential principles make possible the creation of image representations at receiver points in limited detail of the tricolor. This is because the prior art lacks color shift and each line of the picture being re-created always appears in the same color.

Television transmissions in black-and-white are standardized in the United States in such a way that each created picture consists of 525 picture lines (neglecting blanking periods) which are interlaced in a 2:1 relationship. These picture lines are caused, in most systems, to appear as traces on the end of a cathode ray image-producing tube target or screen which may be viewed directly (as in the case of many presently marketed television receivers) or indirectly (as by projection methods in connection with other types of television receivers). Utilization of line-sequential principles of television scanning in tricolor operations, in the case of interlaced transmission or reception of the image signals, means that a scanning of the television picture occurs in such manner that adjacent lines of the color representation of each picture field shall appear in successive picture frames in different colors of a chosen color cycle. The color cycle under such circumstances consists of the primary colors used for color analysis at the transmitter and for color image re-creation at the receiver. Various color primaries may be chosen. For illustrative purposes in connection with this disclosure the primary or component colors will be considered as being appropriate values of red, green, and blue. The color cycle of transmission and reception may be of the order red, green, blue, red, and so forth.

Following these principles of prior art line-sequential operations and conforming substantially also to the now-standardized black-and-white standards of reception, where the 525-line pictures interlaced in the 2:1 relationship are transmitted in such a way that sixty image fields per second are re-created to form thirty pictures, the color detail in a vertical direction will be found to be reduced. This is because of the fact that if an assumption be made that the scanning of the first line of the first field is in red, then each succeeding sixth line will be in the same color. Likewise, the third line of the first field scanned and each sixth line thereafter will appear in the second component or primary color, namely green. The fifth line and each sixth line thereafter will appear in the third component or primary color, namely blue. In the next field scanned which, under the assumed conditions, will represent a trace of all even lines of the pictures, line two of the even field will ordinarily be re-created in blue, while line four will be in red, and line six will be in green. Each sixth line of the picture is of like color in the scanning pattern.

Still following the principles of black-and-white transmission, and with the same standards, it will become apparent that the color in which the lines of the third field will be scanned is a duplication of the color line scanning order of the first field. Similarly, the color line scanning order of the fourth field will duplicate the second field. Consequently, each line of the re-created picture is definitely assigned to one particular color so that in the finally-observed picture, three picture lines are required to trace the three selected colors.

The George E. Sleeper, Jr., patent application, Serial No. 121,861, hereinabove mentioned, has disclosed suitable apparatus and circuits for bringing about a shift in the color scanning order of the different lines of the picture. Instead of restricting the color scanning for each picture line to one color only as with prior art systems, a color shift is introduced into the operation. This produces a change in the color initiating the color cycle. Thus, assuming one form of color shift to take place, provision might be made whereby in the third field scanned, the operation would be substantially like that above mentioned for the first field. Instead of starting the first line of the third field in red and then scanning lines 3, 5, 7, 9, and so forth in green, blue, red, green, blue, and so on, as in the prior art, the color cycle will be maintained, but line 1 would be scanned, for instance, in green (it was in red in the first field). The maintained color cycle then places lines 3, 5, 7, 9, and so on in the colors blue, red, green, blue, and so on. This type of operation increases to a considerable extent the color definition in a vertical direction because it now makes possible the creation of different color values for the same picture lines. The result is that the introduced color shift in the form of the single line shift (as above described and likewise set forth in the above mentioned U. S. patent application Serial No. 121,861) scans like lines of the picture in two colors of the color cycle. This provides twice the vertical color detail obtainable where no shift in color scanning of the chosen lines is introduced.

Likewise, as defined in the mentioned pending patent application, the introduction of a double line shift provides for scanning all picture lines in all colors. This naturally increases still further the vertical color definition.

If now the field scanning rate is maintained at sixty fields per second, as for standard black-and-white operations, it can be seen that regardless of which method above-discussed happens to be used, a picture of 525 lines formed from two separately scanned fields, each of half the number of picture lines of the total, will be traced each 1/30 second, with the separate field scannings accomplished in 1/60 second. However, in the 1/30 second time period, it is not possible in the allotted bandwidth, and for present standards, to trace all picture lines in all colors, although in the time allotted one color representation for each line of the picture has been made once. For conditions of no shift (the first above-described pattern of line-sequential color) the re-created image is reproduced in precisely the same manner and line relationship each 1/30 second. For conditions of single line shift, it can be appreciated that each 1/15 second each picture line has been scanned in two colors. Lastly, for conditions of double line color shift in each 1/10 second, each line of picture is scanned in all three colors of the tricolor.

To achieve the various types of color shift hereinabove proposed, the apparatus and system described by the aforesaid U. S. patent application of George E. Sleeper, Jr., operated to bring about the color shift by reason of a control (in the illustrated form) of the deflection amplitude of the line scanning trace of the cathode ray beam across the image producing tube target. Such a target may be the luminescent screen of a cathode ray image-reproducing tube or the mosaic-responsive image-receiving target of a cathode ray camera tube, for instance. Such control always is effected during blanking periods so that no shift occurs while the beam trace is actually viewed.

One of the most convenient arrangements to provide for line-sequential forms of television scanning operations is to have the image-transmitting tube target or the receiving tube target formed or divided into contiguous areas. Each area is of standard aspect ratio. Each is arranged side by side with respect to each other. The cathode ray scanning beam in its deflection is caused to trace from the first area to the second to the third and then snap back to the first area. The receiver tube target in such a system also consists of three areas coated with different phosphors or other substances producing luminous effects under electron beam impact. Impact of the scanning electron beam as it is modulated by received signals produces on one target section a line image in one color. After this has been accomplished, the continued lateral sweep of the scanning cathode ray beam, after an interruption corresponding to the blanking period, moves over upon a second color-responsive area. At this area the next picture line is traced in a different color. Next, the beam trace is blanked, after which the beam moves into the third coated area to produce the next picture line in the third component or primary color.

This means that the time period over which the scanning beam traces each target section representing one color is equivalent to that required for one line of scanning of a black-and-white picture. Consequently, under existing black-and-white standards, the scanning beam, for the color television line-sequential operation, is caused to move across one target section in 1/15,750 second, precisely the time period allotted for scanning one line of a black-and-white image. Where there are contiguously-positioned component color-responsive areas on a tube, the scanning beam moves from one colored area to the next and finally traces one line in each of three areas. This requires, for the three colors, the same time period as that necessary to trace three successive lines of a black-and-white image. The scanning arrangement for normal black and white is such that signals produced upon a black-and-white image-producing tube do not usually spread over a plurality of adjacent areas having different phosphors but trace successive lines of the now-standardized black-and-white pattern on a tube. This being done, a black-and-white image results.

If, however, color transmission with color shift is utilized, then, as noted in the patent application above mentioned, the control of the color scanning pattern is brought about through the exercise of a special control upon the line or horizontal scanning beam motion. The color shift is brought about by modifying the scanning beam deflection in its lateral motion within the cathode ray tube. Instead of permitting the beam to be deflected in a linear path to scan one line of all the red, the green, and the blue phosphors, the scanning beam is caused to move, for instance, across the red, the green, and a part of the blue (for example, half of the blue) and snap back to recommence the scanning of the red area. Then, to effect one complete line of color shift, the same procedure occurs again so that for two lateral deflections, for instance, only five-sixths of the lateral sweep of the three separate image areas is traced, but, as far as the overall scanning operation is concerned, the scanning beam is shifted in position in such a way that relative to other events taking place, a one-line shift is made in the color scanning. These shifts occur during the period of vertical blanking as standardized in television transmission where vertical blanking was initiated precisely as defined by presently adopted "Standards of Good Engineering Practice Concerning Television Broadcasting Stations" as published by the FCC and effective December 19, 1945.

Starting substantially coincidentally with the formation of certain equalizing pulses, the vertical blanking period continues through the time to transmit the long vertical deflection control pulses and then through a period over which certain additional equalizing pulses and other line sync pulses were sent out. The standards establish that vertical blanking shall be for a period of 0.05V, to which a supplemental time period represented by 0.03V may be added. The letter V in this formula represents the time between the commencement of one field scanning and the commencement of the next succeeding field scanning. Thus, a period of 0.08V for a 525-line picture occupies 21 lines of a black-and-white transmission. In any case, this 21-line period provides ample time within which to bring about two separate oscillatory controls of deflection in a horizontal or line-scanning direction, and, as explained in the aforesaid U. S. patent application, color shift may be introduced in this portion of the operational cycle.

The present invention likewise is concerned with ways and means to effect color shift. Instead of controlling color shift by modifying the scanning operation in the high speed deflection direction, as for the line deflection control, this invention aims to disclose ways and means in which the scanning beam deflection is controlled in its slow speed direction, or in its vertical or field deflection path. For some conditions of operation greatly improved operational stability is obtained. In addition, receiver and transmitter components are simplified to some extent.

The aforesaid patent application Serial No. 121,861 describes the control of the horizontal beam deflection under the influence of a unique type of synchronizing pulse, such as a slotted sync pulse. Such a slotted pulse indicates to each receiver the commencement of color scanning in one color of the selected color cycle of red, green, blue, red, and so on. The slotted pulse signal is not of such a variety as deleteriously to affect the operation of black-and-white television receivers receiving the color video signals and operating under the control of the synchronizing pulses transmitted therewith. The slotted synchronizing pulse operates to control or modify only color receiver deflections at times when a color phase change is to be initiated. To bring about this modification of deflection of the scanning beam pattern in the color receiver as the scanning beam is being moved laterally in the high speed or line deflection pattern, the control has to be exercised upon the scanning beam (if the shift is accomplished within the vertical blanking period) in a time period sometimes as short as two-thirds of the horizontal deflection cycle and usually not greater than five-sixths of such period. This often means that in the line deflection oscillator it is difficult to control stability because it is not particularly susceptible to any abrupt modification of its functioning, and particularly so when the modification is to occur at such an early time in its operative cycle. Therefore, particularly in transmitter fringe areas and in areas of particularly noisy signal reception, or in areas where particularly bad multipath or ghost image signals tend to reach receivers, deflection stability in a horizontal or line direction tends to be lost during the relatively short period of vertical blanking. The instability is noted mainly in the upper part of the re-created image, which tends to "tear out" until operation becomes better stabilized at a later part of the cycle.

By taking recourse to the present invention by which a control of the color shift is exercised in accordance with a change in the operation of the vertical or low-speed field deflection, any shift of as much as one line becomes an extremely small percentage change in the operation cycle of the low-speed or vertical field deflection generator. As an example, a shift of one line in the vertical oscillator period means only one (1) part in 262½ by present standards. Such a shift is thus easily achieved. A one-line shift in the horizontal or line oscillator is a shift of one part in three, where three adjacent images are scanned. Such a shift is difficult to obtain at all times.

It will be appreciated that color shift changes the color-scanning order by a net advancement or retardation of a single line. Therefore, if the vertical deflection of the scanning beam can be controlled in such a way as to start at a time period equal to one or even two horizontal scanning lines early or late, the color shift can be readily accomplished. For example, considering present transmission standards of a 525-line picture re-created at a rate of thirty picture frames per second interlaced by 2:1, there will be produced during each vertical deflection of the scanning beam 262½ picture lines per field. These will occur in a 1/60-second time period. Consequently, under presently-standardized operations for television of black and white, there is produced each 1/60 second a series of vertical deflection control impulses. Because of the timing relative to the horizontal deflections these deflections cause the successively traced image fields to interlace. For the odd picture fields the odd picture lines, such as 1, 3, 5, may be assumed to be traced. For the even fields the even lines, such as 2, 4, 6, 8, and so on are assumed to be traced. By reproducing these picture fields in sequence, the picture lines appear to follow in order or are interlaced; the picture detail is improved; flicker effects are greatly reduced; a more efficient picture reproduction occurs; and a better bandwidth utilization for a selected picture detail is established.

If now the vertical deflection is caused to occur after only 261½ lines in the vertical direction with the color operation of scanning continued in the established color cycle of red, green, blue, red, and so on, it can be appreciated that instead of line 2 of the second field being traced in blue as would be the case where line 1 of the first field started in red (by the above illustrated example) and the assumed color cycle here in effect, the scanning operation would be such that line 2 of the second field would be traced in green because the vertical deflection took place one line ahead of its normal operation. On the other hand, if the vertical deflection took place after the scanning of 263½ lines of the first field, line 2 of the second field would be traced in red rather than blue because the vertical deflection was one line "late." If the vertical deflection took place precisely after 262½ lines and line 1 of field 1 were started in red, then line 2 of field 2 would be re-created in blue. The delay of two lines would be equivalent to an advance of one line. Such reference to "traced" as is included in this paragraph and the description as a whole is intended to refer to coming within the visible window of image reproduction, which, of course, means the picture lines are traced outside the normal blanking period.

The change of a one-line period over which the vertical deflection control is caused to function both "early" and "late" indicates the percentage change from the normal vertical operation will be merely of the order of one-third of one per cent rather than of the order of sixteen per cent at the minimum as was the case for the horizontal shift above discussed. Accordingly, despite the inertia of the deflection circuits and the tendency thereof to maintain their normal state of operation, limited modifications of their periodicity can readily be effected without in any substantial manner upsetting the normal operational state. With limited percentage change in operation the so-called automatic frequency control methods of line deflection commonly used for black-and-white receiver operation at the present date are readily adaptable to control. This is not true for systems requiring a large percentage in the operational state of the line deflection generator. It is usually desirable in color television operations to include automatic frequency control circuits in the receiver to maintain line frequency stability. Where color shift is effected by producing a control of the vertical scanning operation such stabilized circuits can easily be used. Further than this, the decreased burden of the receiver deflection circuits following rapid or large percentage changes in the state of operation tends to improve reproduced color quality. Still further, because of the fact that modifications in the nature of the horizontal deflection control are transferred to the slower-acting vertical deflection circuits, it is possible to obtain higher fidelity operation of a black-and-white receiver to which the color television transmission signals are supplied to re-create black-and-white image reproductions. This comes about through the improved operation of the stabilizing, clamping and D. C.-restoring circuits at both the transmitter and the receiver.

Despite the fact that the color shift herein to be disclosed is brought about in the operation of the vertical circuit, it is nonetheless important to establish the timing of the color scanning operation. One way to achieve the result is that disclosed in the aforesaid U. S. patent application of George E. Sleeper, Jr. The color shift is brought about in accordance with this present disclosure by effectively changing the starting point of a color line scanning with respect to the viewing window or visible area of the re-created picture.

The color timing or the color sync may be regarded as being dependent upon the starting of one color of the selected color sequence. This is because it is desirable to sync one particular color relative to the others. A suitable time to provide this result is following the shifted location of the vertical deflection pulses. At such time a signal defining one of the selected colors of the color cycle is transmitted. A signal of a character suitable for such purpose may be of the notched pulse variety set forth and described in the aforesaid U. S. patent application of George E. Sleeper, Jr. A pulse of this character, illustratively, may be indicative of a so-called "red" scanning operation. The notched pulse, under these circumstances, may occur with precise regularity. Every third synchronizing pulse may be notched for line control scanning operation. Alternatively, this notched synchronizing signal control pulse (or an elongated synchronizing signal) may occur only during the vertical blanking period. The control pulse is set to follow the selected form of vertical syncing signals. Still further, this type of color sync information may result from the selection in the receiver of a burst of high-frequency energy caused to follow from the transmitter after the transmission of the vertical synchronizing pulses. Selection of the color sync or the timing of the color also may be under the control of a widened pulse. Preferably the color sync starts coincidentally with a line deflection control pulse. The line sync pulse under consideration at this point follows the vertical control pulses but occurs during the vertical blanking period.

The present invention seeks to provide ways and means for utilizing each and all of these forms of control signals to bring about color shift. It serves also to improve the stability of line sequential types of multicolor television image production.

In its broader concept the invention provides ways and means by which signals which will control color shift are developed at transmission points and utilized at signal receiving points. The form of signal developed and used for control is maintained as close as possible to the presently standardized forms of television synchronizing signal waveforms used for black and white transmissions. The television synchronizing waveform usable for black-and-white for the alternate odd and even fields is depicted in Appendix I on Page 19 of the "Standards of Good Engineering Practice Concerning Television Broadcast Stations" effective December 19, 1945 and authorized by the Federal Communications Commission, which publication was printed at the U. S. Government Printing Office, Washington, D. C., in 1948. To bring about shifts of the character herein to be described in the line sequential color pattern, minor signal modifications only occurring during the vertical blanking period are relied upon. The long-duration vertical sync pulses are maintained precisely in the same form as is customary for black-and-white operations. Likewise, each of the leading and trailing equalizing pulses and the line sync pulses are maintained in precisely the same form as is customary for black-and-white operations. However, in black-and-white operations it has been customary to utilize during the vertical blanking period six equalizing pulses occurring at half-line frequency before and after the rather long duration vertical sync pulses. Then, it is usual to follow the trailing equalizing pulses by additional line frequency sync pulses during the otherwise unused portion of the vertical blanking period. The black-and-white method therefore restricts the equalizing pulses to twelve, of which six precede and six follow the long vertical pulses. The total transmission time for the equalizing and vertical sync pulses thus represents a period of nine lines of black-and-white transmission.

The present invention modifies this form of sync pulse to the extent that it stretches the time period occupied by all of the equalizing and vertical sync pulses from one corresponding to a nine-line black-and-white transmission period to a ten-line period, where a single-shift color operation is relied upon, and to an eleven-line period where double-shift color operation is relied upon. These slightly modified signal waveforms produce the line sequential color pattern. In all instances the proposed method is such that the elongated vertical sync pulses are retained in precisely their normal form. The effective color shift is brought about by moving the six long vertical pulses as a group within the portion of the scanning period occupied by the leading equalizing, the elongated vertical sync and the trailing equalizing pulses. Thus, for instance, in the single-shift operation the vertical sync pulses in the scanned line (where no color shift is brought about) might be preceded by the usual six equalizing pulses and followed by eight equalizing pulses. Then, to provide the color shift in the next scanned field, the six vertical sync pulses would be preceded by eight equalizing pulses (rather than six) and followed by six equalizing pulses (rather than eight). The resulting effect is that following each second field a color shift is introduced because a greater number of equalizing pulses precede the vertical sync pulse, which means that the vertical sync pulse arrives "late" by one line, as it were (that is, after 263½ lines of field scanning). Thus, the first line trace to appear subsequent to the vertical blanking period which would provide an observable trace in the viewing window of the image raster will be the color following in the sequence from that which normally should appear had the vertical deflection commenced at a point in time coincident with the completion of the normal 262½ scanned lines for black-and-white.

On the other hand, where double color shift is relied upon, the total time period allotted to equalizing pulses (both the leading and trailing) and the vertical sync is eleven lines of the black-and-white picture. Then, to effect color shift, and depending upon the type of shift pattern desired, the group of six vertical pulses may be caused to appear anywhere within the time period of 11H (H, as in the preceding example, being the time from the start of one scanning line to the start of the next succeeding line of the black-and-white pattern), so long as they do not commence until a time period equal to 3H after the commencement of the equalizing pulses, and so long as they commence no later than a time period 5H after the commencement of the equalizing pulses. To shift the scanned pattern through one line, or from one color to the next following in the color cycle, the vertical sync pulses may be delayed by a time period of 1H. To shift two colors in the color cycle, the vertical pulses may be delayed by a period 2H from that time at which they normally would be expected to appear. In this way the color shift, which can be defined as the change in the color initiating the color cycle, can be provided solely under the control of the vertical synchronizing pulse and completely to the exclusion of the horizontal or line synchronizing pulses, as explained in the above-mentioned copending U. S. patent application of George E. Sleeper, Jr. In this connection, the color cycle will be assumed for the purpose of this description to be red, green, blue, red, and so on. Line sequential color scanning will be understood to mean the scanning of a television picture field or raster in such manner that adjacent lines of the reproduced color representation of each picture field are caused to appear in different colors of the color cycle.

The foregoing explains generally the principles upon which the transmission of color control signal pulses is brought about. These pulses so produced are transmitted over the signal channel together with the video information (usually accompanied by the audio information). They cause the television receiver apparatus to function to establish the color shift pattern in the reproduced image areas.

Broadly speaking, where this type of deflection is used, the receiver instrumentality may operate with a highly stabilized line deflection control, even to the point where automatic frequency control to establish line deflection stability is relied upon. Proper phasing and highly stabilized line scanning at the receiver instrumentality is insured. It is desirable in this type of transmission to include with the signals and following the vertical pulse signal series some suitable signal of color line indication. This type of signal is included within the vertical blanking period. The color line signal is such as to provide color phasing to insure proper allocation of a selected color to particular lines of the picture. Such a color phasing pulse, when received at receiver instrumentalities, causes the excitation of a suitable control circuit functioning along with the line deflection control. Its automatically stabilized receiver operation may still be utilized. The control may be provided through the use of a trigger circuit, herein to be explained, which serves to work along with the automatic frequency control or the deflection circuit control, or both, as the case may be, so that scanning of any one selected color of the sequence is initiated at the appropriate time.

With these features and general principles in mind it becomes an object of this invention to provide a line sequential system of color television wherein color shift to improve vertical picture detail is established through the use of circuits and control means having higher stability of operation than circuits heretofore known. It is also an object of the invention to provide apparatus and circuits to establish line sequential color television with color shift where the controlling circuits are substantially immune to the effects of noise and interference, as well as multipath, so that greater operational stability is possible.

Many other objects and advantages of the invention of course will become apparent to those skilled in the art to which the invention is directed, when the following description and claims are read in connection with the accompanying drawings, of which:

Figs. 3, 4 and 5 are exemplifications of color patterns in line sequential color television operations showing a picture consisting of seven lines only for illustrative purposes only, as traced through seven successive fields, using zero shift, single shift and double shift respectively;

Figure 13:
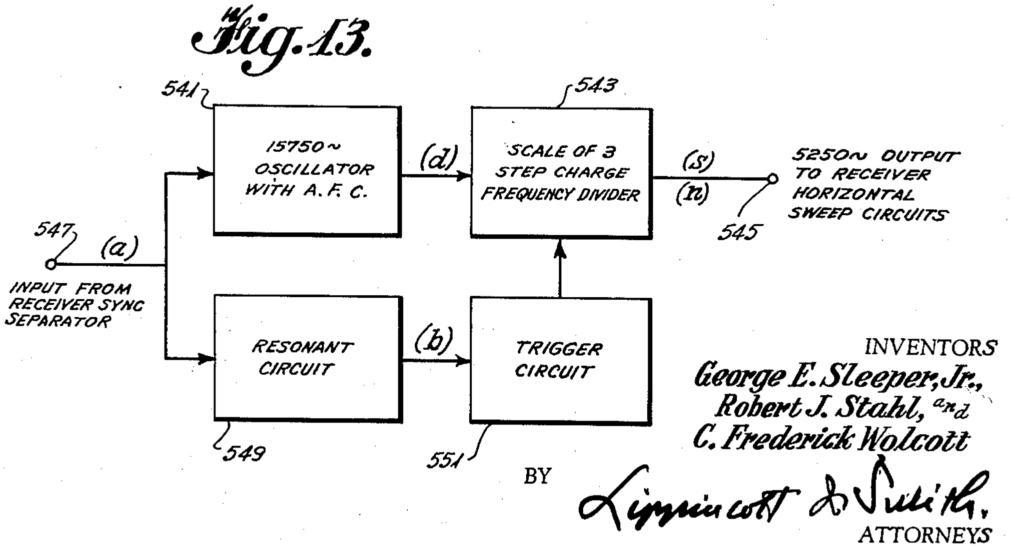
Figures 6, 7, 8, 15:
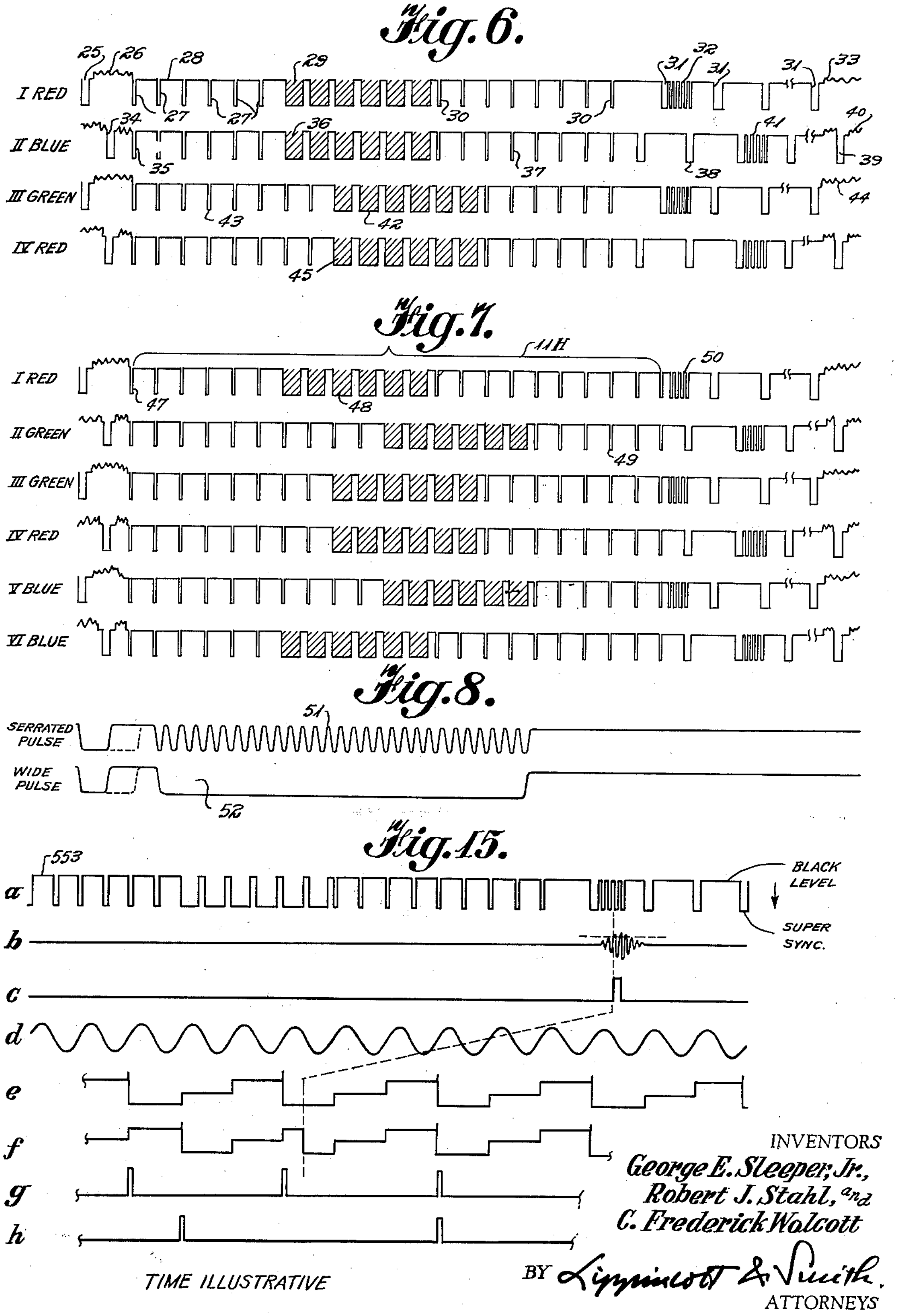
Fig. 6 is a schematic representation of waveforms occurring during the vertical blanking period for line sequential color television operations when single shift is employed.
Fig. 7 is a series of curves, also occurring during the vertical blanking period, to show a line sequential television operation during the vertical blanking period of six successive picture fields, when double shift is employed.
Fig. 8 is an expanded view of the color sync pulse which appears in the diagrammed illustrations of Figs. 6 and 7, as pulses substantially black in appearance.
Figure 9:
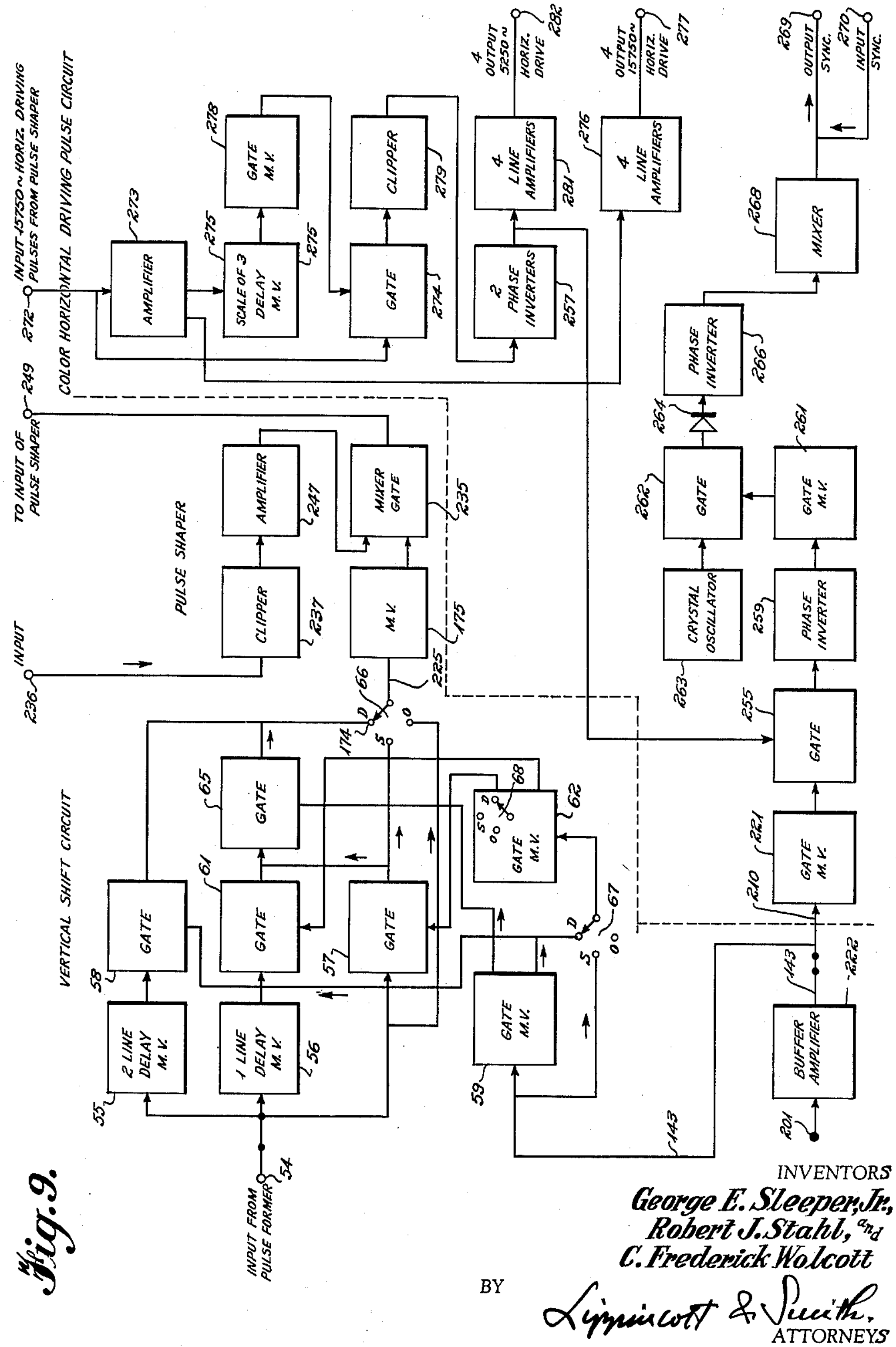
Fig. 9 is a block diagram of the color shift control unit to operate in conjunction with the sync signal generator which is diagrammatically shown in Fig. 1.
Figure 10:
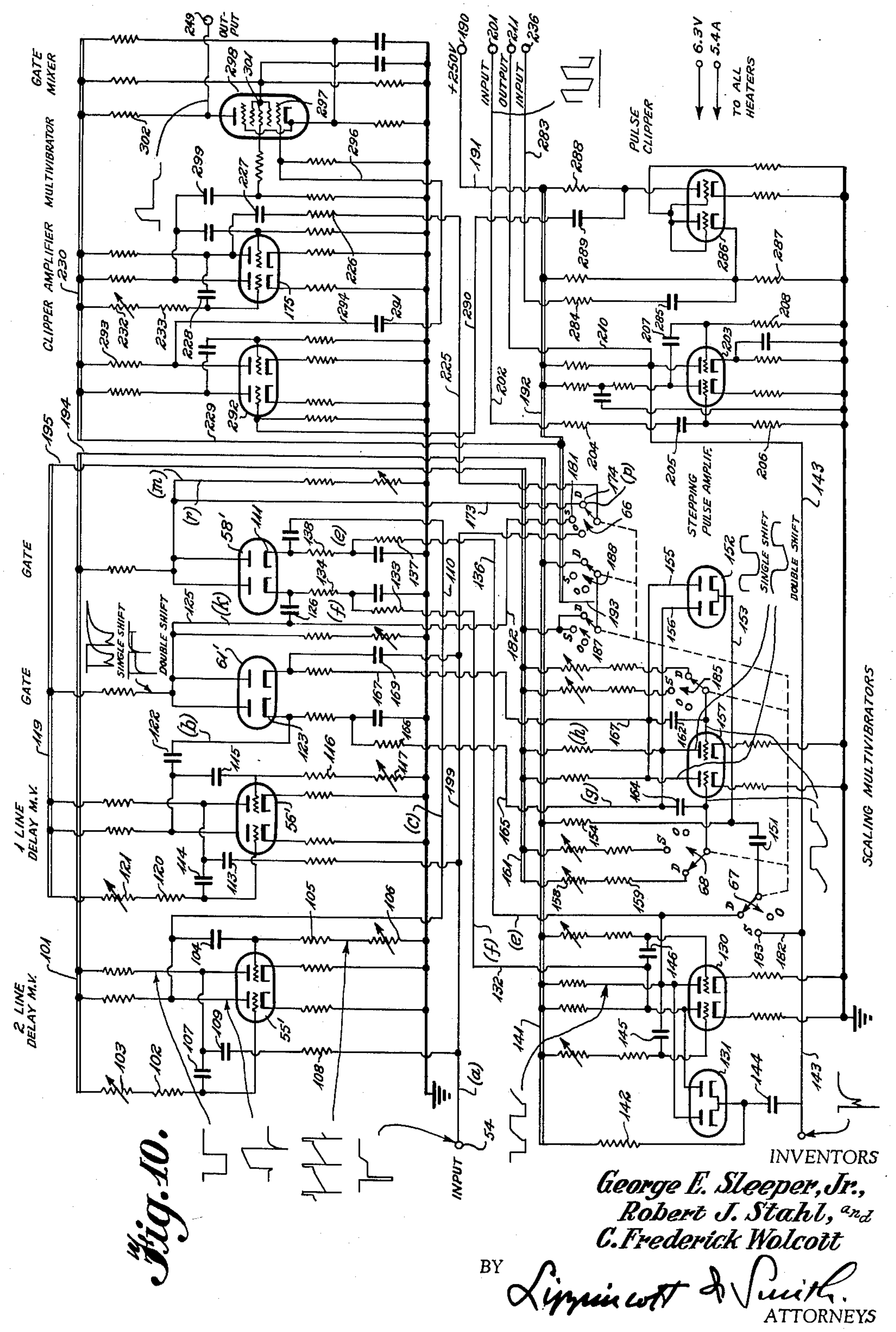
Fig. 10 is a circuit diagram illustration of one preferred circuit to include the vertical shift, the pulse standardizer or shaper and the buffer, schematically represented in Fig. 9.
Figure 11:
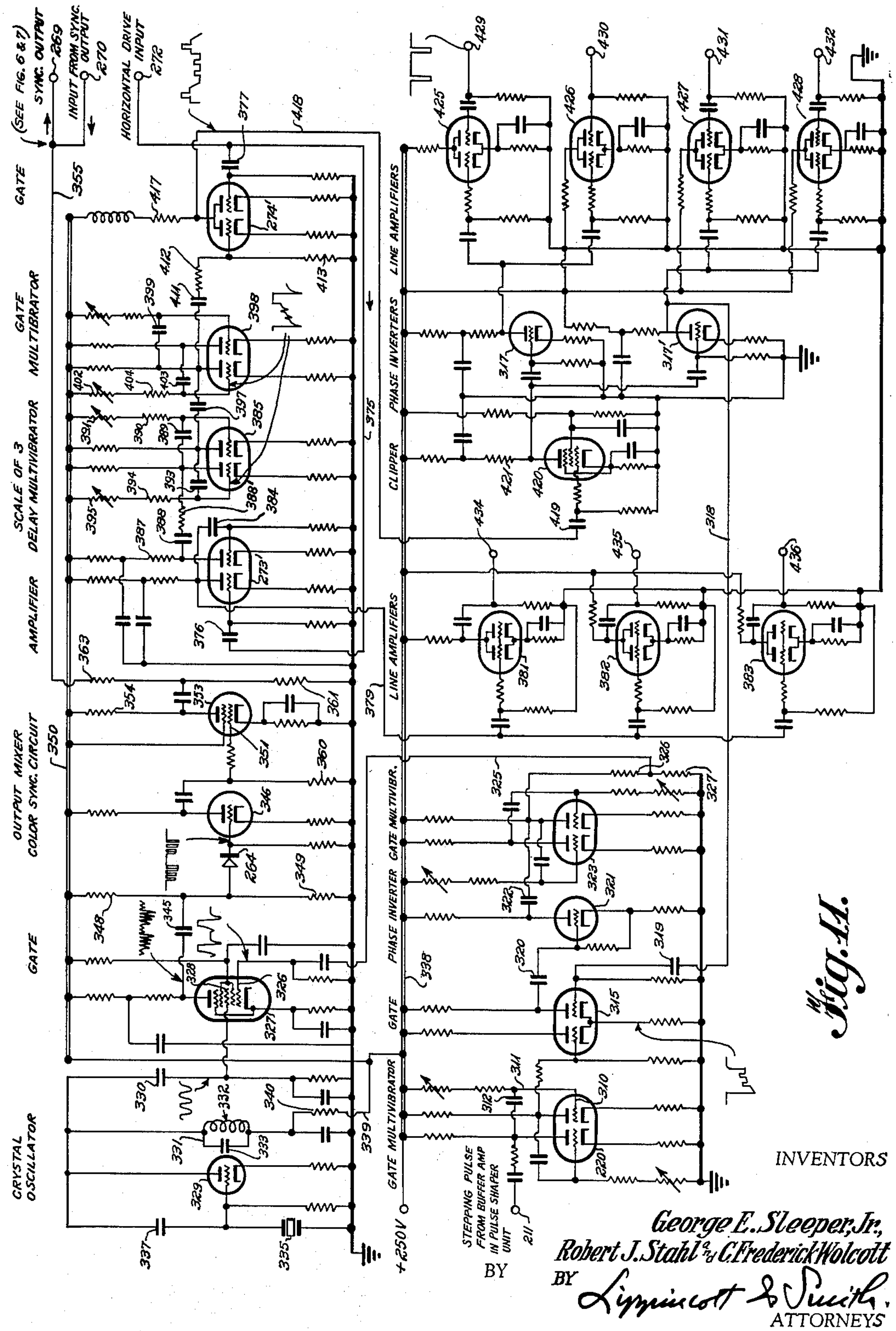
Fig. 11 is a circuit diagram of the color sync generator representing a remaining portion of Fig. 9 and shows the color horizontal driving pulse circuit, together with the gating multivibrator and phase inverter.
Figure 12:
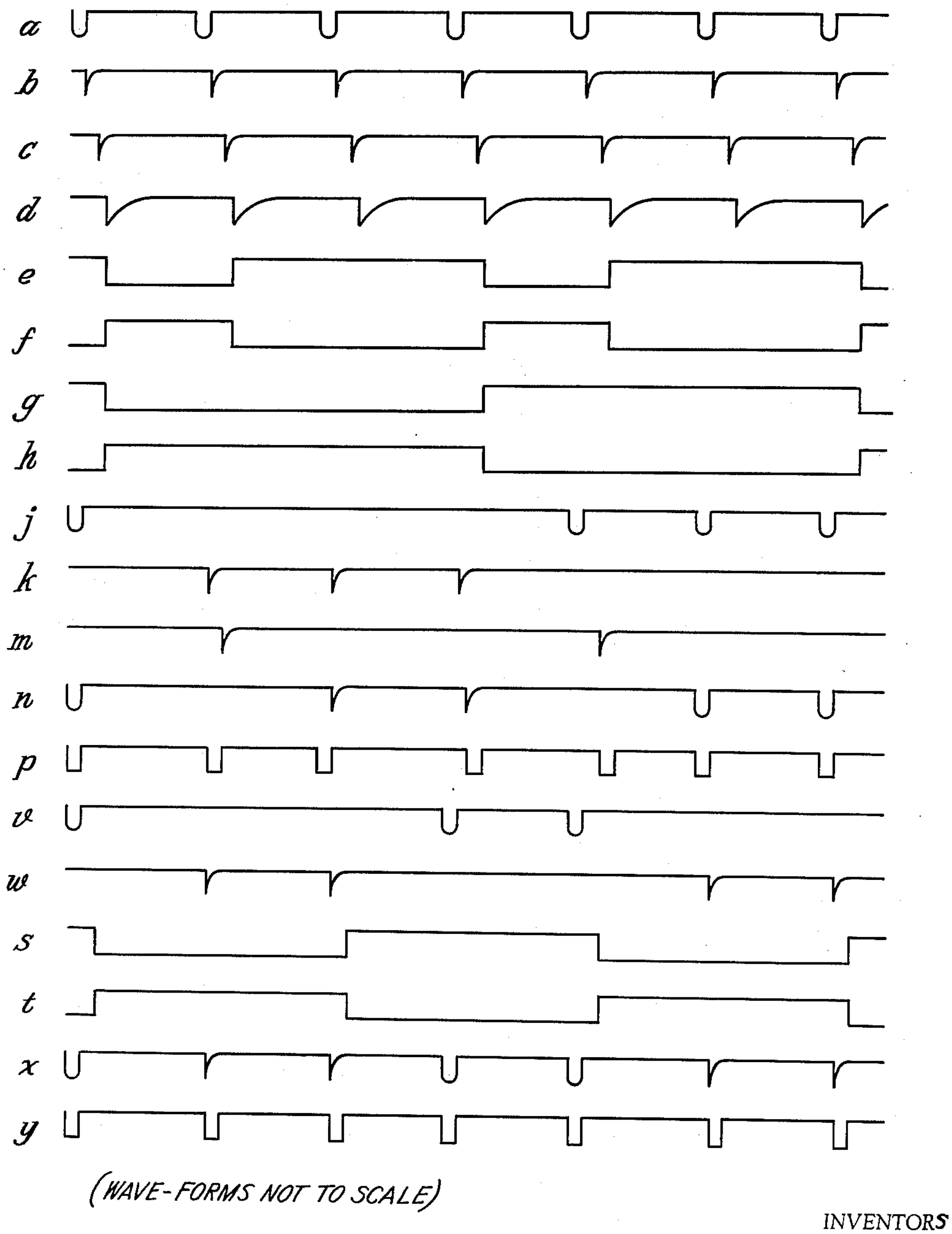
Figure 14:
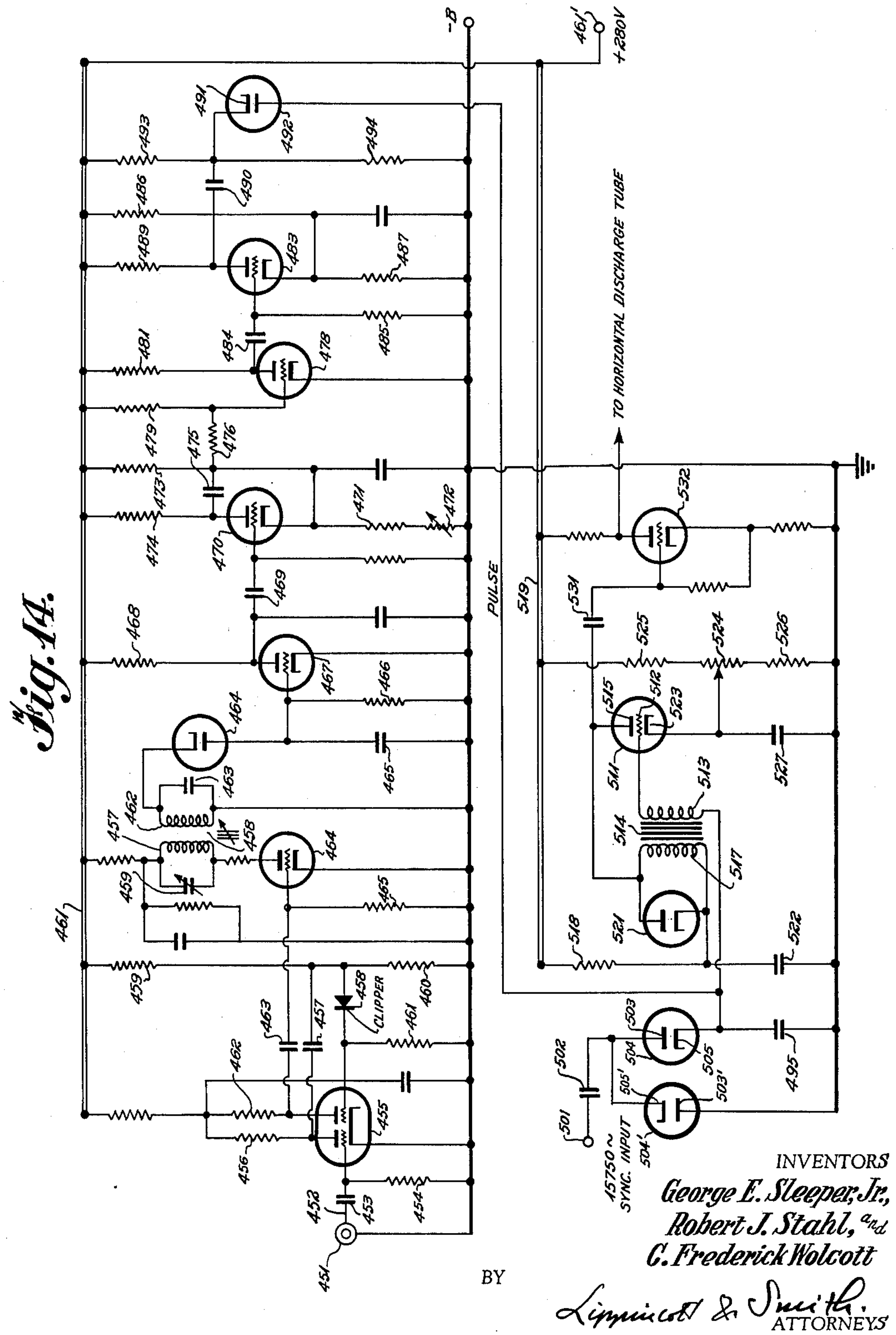

Fig. 12 consists of a plurality of waveforms serving to indicate the operation of the circuit diagrammatically represented by Fig. 9 and represented circuitwise in Figs. 10 and 11. In this connection it may be noted that the waveforms shown by Fig. 12 are drawn for illustration of the operation, rather than precisely to scale, and, in some instances, for clarity of explanation, the polarities have been arbitrarily indicated and need not necessarily be as indicated;

Fig. 13 is a block diagram representative of the color receiver sync selection system;

Fig. 14 is a circuit diagram illustrative of one form of circuit for operating in accordance with the broad principles of Fig. 13;

Fig. 15 is a series of waveforms likewise not necessarily to scale, and with arbitrarily chosen polarities to depict the operations of the receiver circuit of Fig. 14.

Figure 1:
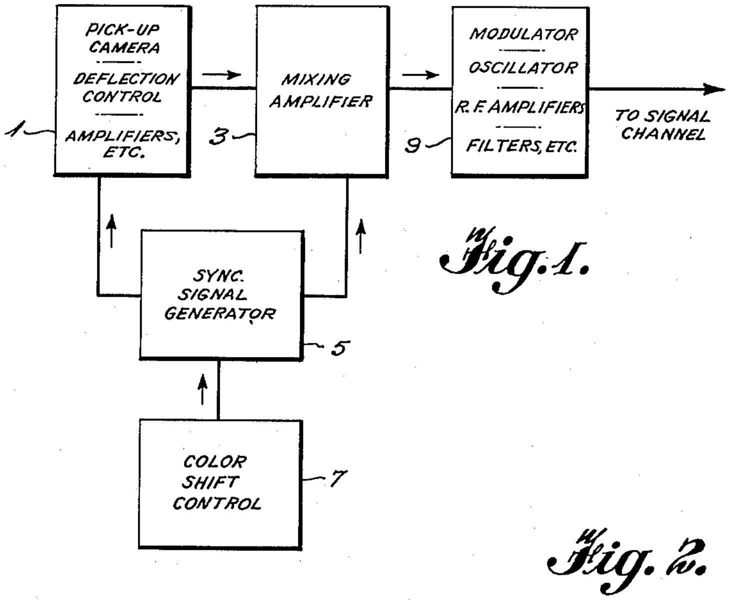
Fig. 1 is a block diagram illustrating schematically a transmitter unit incorporating the invention.

Making reference now to Fig. 1 of the drawings, there have been shown for illustrative purposes some of the more important components of a television transmitter pickup system. The unit 1 may comprise, for instance, the pickup camera to convert the optical images into video signals. It will be understood to include, for the purpose of illustration only, the deflection controls for the operation, the necessary preamplifiers, the line amplifiers and the like. The output signals from this unit are intended to feed to a second amplifier 3, commonly known as the mixing amplifier. Operation of the pickup camera is established through the deflection control functioning under the influence and control of an appropriate form of sync signal generator depicted at 5. The sync signal generator is arranged to provide deflection control, so that the operation is in accordance with the "Standards of Good Engineering Concerning Broadcast Stations" as above mentioned, except insofar as modification is introduced by the color shift control unit 7. This color shift control will be more particularly explained in connection with the block diagram showing of Fig. 9, the circuit diagrams shown by Figs. 10 and 11, and the waveforms depicted by Fig. 12.

The output from the sync signal generator 5, in addition to its control of the pickup camera and the therewith associated apparatus, feeds output signals to the mixing amplifier 3. The mixed signals are appropriately combined to form the composite video and sync signal series prior to the control thereby of the schematically represented modulator 9. The modulator 9 may be assumed to include also the oscillator, the necessary R. F. amplifiers, the vestigial sideband filters and all other circuit components necessary to feed the R. F. signal either to an antenna or to any appropriate form of communication channel to feed out to receiver, relay or monitoring points. No power supplies have been indicated. The main function of Fig. 1 may be generally regarded as being that of showing the general relationship of the color shift control unit to the other components of a television system designed primarily for color operation, although capable also of producing signals for black-and-white transmission, as has already been mentioned in the hereinabove reference to U. S. patent application of George E. Sleeper, Jr.

Figure 2:
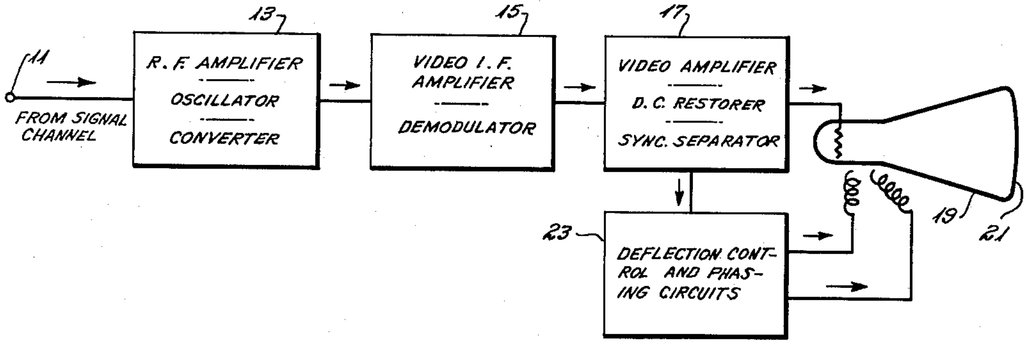
Fig. 2 is a schematic block diagram of a television receiver incorporating the invention.

In Fig. 2 there has been shown in an extremely schematic form a television receiver (disregarding any audio components). This receiver is intended to be the form to re-create color television image patterns or rasters under the influence of signals sent out from a transmitter such as that represented by Fig. 1. The receiver instrumentality of Fig. 2 likewise will function to receive and reproduce television signals in black-and-white, where signals received originate at a now-standardized black-and-white transmitter. The signals from the television signal channel, whether it be a cable, a relay or a radio source, may be received at the terminal 11 and supplied through an appropriate R. F. amplifier, oscillator and converter unit 13, for amplification in the video I. F. amplifier 15. The signals then are fed to the therewith associated demodulator.

The output from the demodulator is shown in Fig. 2 as feeding into a unit 17, which may be assumed to include the video amplifier, the D. C. restorer and the sync separator. Output signals from this unit are supplied to modulate the cathode ray beam produced within an image-producing tube 19. Luminous effects resulting on the tube target area 21 may be considered to be intensity modulated in accordance with the radio transmission of signals from the pickup camera of Fig. 1. Any appropriate method to cause the scanning cathode ray beam in the tube 19 to traverse the target may be utilized. Electromagnetic or electrostatic deflection, or a combination of both, is suitable. The sync signals are separated from the video signals in the unit 17. Separated signals are supplied to a portion of the circuit designated at 23. The unit 23 can be assumed to include the deflection control and phasing circuits. Such circuits serve, first, to establish synchronous operation of the receiver scanning with that of the transmitter, and, second, properly to phase the receiver operation with respect to the transmitter.

The unit depicted at 23 will be understood to include that component which is schematically represented by Fig. 13 and shown in one of its preferred forms in Fig. 14. The operation of such unit will be still further described in its operation by the curves of Fig. 15.

The showing of Fig. 2 is thus purely schematically illustrative. The figure has as its main purpose that of showing the relationship of certain receiver components to the unit as a whole.

It was above pointed out in the general statements concerning this invention that the control method provided was such that various shift patterns of color representation in a line sequential system might be produced. Purely as illustrative of this operation, reference may now be made to Figs. 3, 4 and 5, portraying zero shift, single color shift and double color shift. In these figures the Roman numerals heading columns represent successively traced fields of the finally-produced image pattern. The row designations represent the lines of the image traced in each field. The letters "R," "G" and "B" respectively represent the colors red, green and blue, in accordance with which each line of the image at the transmitter is analyzed and the color representation reproduced at receiving points.

Where no color shift (zero shift) takes place in the line trace from field to field and the color cycle is assumed to be in the order of red, green, blue, red and so on, the pattern of Fig. 3 must necessarily result, if it be assumed that the first line of the picture coming within the visible window (that is, outside of the blanking period) starts with red. This, it will be seen, requires lines 1 and 3 of Field I and line 2 of Field II to produce, for instance, adjacent lines in all colors. The resulting color raster is one in which some vertical color definition is lost as compared to black-and-white definition, although there is a freedom from color flicker and color crawl.

Turning now to Fig. 4, a pattern utilizing "single color shift" is depicted. This term means that each line of the image raster appears in at least two colors within a sequence of each four field scannings. Considering the image raster of Fig. 4, line 1, for instance, it is shown as red in Field I; it changes to green in Field III, and then returns to red in Field V. Similarly, raster line 2 appears as blue in Field II; in red in Field IV; and then returns to blue in Field VI. The color shift or change effect is obtained in the scanning raster by changing the time at which the vertical deflection occurs with respect to the total number of lines traced per field.

With the zero color shift pattern arrangement of Fig. 3, each field deflection occurs precisely at the end of 262½ lines of horizontal or line deflection. In the single color shift pattern of Fig. 4, for instance, the vertical deflection which causes the production of Field II following the scanning of Field I occurs after 262½ lines. Following Field II the line trace for Field III commences only after 263½ lines of scanning following the start of Field II. The scanning of Field IV commences at a time following 262½ horizontal line traces subsequent to the commencement of Field III. Lastly, to return to the starting condition of Field I, as the scanning enters Field V, the elapsed time between the start of Field IV and the start of Field V is only 261½ lines. This means that in any four picture fields 1050 picture lines (as referred to present black-and-white standards) will have been traced in the time interval between the commencement of the first and fourth field scannings, which is precisely the number of scanned lines for four black-and-white field scannings. However, with a colorshift operation in effect the start of any one field scanning with respect to that following or preceding may vary within the order of one line, or over a period equal to H, where H represents the time between the start of one line scanning and that line next following in accordance with the "Standards of Good Engineering Practice Concerning Television Broadcast Stations" so that the color shift is introduced.

The pattern depicted by Fig. 5 is one showing one form of the so-called double shift color scanning operation wherein following selected fields a line shift is made prior to entering into the next succeeding field. This shift is either one or two lines, ahead or behind, to provide the color shift desired. In this way it will be apparent that each line of the raster or pattern is traced in each color within a time period occupied by the scanning of six picture fields (three picture frames). Many patterns for double shift are obtainable. One other such pattern would be that which would result when the vertical scanning beam deflection due to the vertical deflection control pulse following the scanning of Field I of the pattern occurred after 262½ picture lines had been scanned; the deflection in the vertical direction following Field II might occur after the scanning of 263½ lines of the raster or scanning pattern; the deflection in the vertical direction following Field III might occur after the scanning of 262½ lines of the raster or scanning pattern; the vertical deflection following Field IV might occur following the scanning of 261½ lines of the traced pattern; following Field V the indicated line trace would appear if the vertical deflection took place after scanning 262½ lines; and the vertical deflection of the beam after the sixth field also might occur following 263½ lines of the traced pattern, which would bring about a scanning pattern for Field VII precisely like Field I, after which the above-described conditions would be repeated. The pattern described by Fig. 5 is to be considered purely illustrative of one of those which might be traced for different forms of the double color shift.

Reverting now to Fig. 6 of the drawings, the waveforms there shown cover the general signal wave pattern formation which occurs during substantially only the vertical (field) blanking interval. In this figure the first line shows at the left a line synchronizing pulse which will control the starting of the last line of the picture field preceding Field I (this would be a line traced in red if reference is made to Fig. 4). The waveform portion 26 represents the video information for the last-scanned line of the field preceding Field I. The time period started by the equalizing pulse shown at 27 represents vertical blanking. In this particular figure of the drawings the signal polarity shown extending in the downward direction represents that signal which would produce the maximum carrier output at the transmitter. The signal level indicated at 28 represents black in the picture so that the waveform portion 26 in the particular instance shown is in the direction toward highlights in the picture. Similarly, the line sync pulses 25 and the equalizing pulses 27, as is customary in illustrating signal waveforms of this character, are in the direction of maximum signal, so that for the system transmitting black-and-white these would represent an intensity "blacker-than-black" or "ultra-black." In this particular waveform it can be seen that six equalizing pulses 27 are arranged to precede a group of six elongated vertical synchronizing pulses represented at 29.

The figure shades the vertical sync pulses to make them readily identifiable. They control the vertical deflection of the scanning cathode ray in the receiver sets in known manner. They usually exercise control of deflection after passing through well-known integrating circuits. The elongated vertical sync pulses 29 are followed in the illustrated example by eight trailing equalizing pulses prior to the transmission of any additional line sync pulses 31. The form of the line sync pulses 25, the leading equalizing pulses 27, the vertical sync pulses 29, the trailing equalizing pulses 30 and the line sync pulses 31 is precisely the same as in black-and-white transmission. The significant difference from black-and-white transmission is that the vertical sync pulses 29 are followed in this instance by eight equalizing pulses 30 rather than six for black-and-white.

In the depicted illustration for the red pattern trace in the first line of Field I of Fig. 6 vertical blanking which commences with the first equalizing pulse 27 continues through the line sync pulse 31 furthest to the right and immediately preceding the resumption of video signal transmission represented at 33 for this first line. It should be noted that the series of pulses is broken in time to indicate a time interruption, in that, for the purpose of illustrating this invention, the blanking period between the equalizing pulse 27 furthest to the left and the line sync pulse 31 furthest to the right may be assumed as being equal to a period of 21H or 8% of V. The time "V" is that between the start of two successive black-and-white field scannings. For the condition shown by this line, the form of signal waveform depicted will operate through the usual integrating circuit to cause the vertical deflection circuit to function and to snap the scanning cathode ray beam back at some selected time during the period of production of the six elongated pulses. The precise time in the cycle when the snap-back occurs may vary slightly from receiver to receiver but remains generally constant at some point within the six long duration pulses for each individual receiver.

To phase the color operation a signal is developed following certain of the line sync impulses 31. The phasing signal is represented at 32. This phasing signal, as illustrated in Fig. 6, comprises a burst of high frequency oscillations. These signals may be developed from some local oscillator which is keyed once during each cycle of vertical deflection period. The pulses or oscillating waveform 32 may conveniently be in the form of a sine wave of a frequency of the order of about one megacycle which is keyed on and off once during each vertical deflection field period. The phasing signal, when received at receiving points, operates together with the horizontal or line sync signals, the equalizing pulses, and the vertical sync signals, to control the beam deflection in the image-reproducing tube. These signals control the scanning beam deflection and the color phasing circuits, as schematically depicted by Fig. 2 by the element 23. The various color shift patterns may result as desired.

Following the last line sync pulse 31 to the right of line I video signal information represented by the waveform 33 is then transmitted and continues through the remainder of the first picture field. With the last half line of video information in Field I represented at 34 opposite the designation II in this Fig. 6, the vertical blanking period again commences substantially concomitantly with the development of the first equalizing pulse 35 of the series following the first-scanned field. If the initially scanned line of the next field traced (that is, line 2 of the first-produced picture frame) is commenced with blue no color shift in the line scanning order results. Accordingly, the sync pulses so occur that the vertical sync pulse series 36 follows six equalizing pulses 35 (as at the start of the first field). Again the vertical sync pulse is followed by eight equalizing pulses 37 and a certain number of line sync pulses 38 prior to the commencement of the visible transmissions which would follow the line sync pulse 39, the video information being depicted illustratively at 40. A phasing pulse consisting of a burst of high-frequency energy, for instance, may be used for color phasing as for Field I. Each of the phasing pulses series 32 and 41 which are high-frequency energy bursts of like frequency may be considered to indicate the commencement of the "red" scanning operation (as one assumed form). The control may be established from the pulses selected under control of this particular wave series. This permits the color to interlace.

If reference is now made to Fig. 4 of the drawings, it will be noted that line 1 of Field III commences with a scanning of green in the picture, as contrasted to line 1 of Field I which started in red. This change to green in Field III represents a delay of one scanned picture or raster line (or an advance of two lines). To bring about such delay the vertical deflection control pulse series 42 shown on the third line of Fig. 6 opposite the designation III is preceded by eight equalizing pulses. This means that the vertical deflection control will not operate until a time period 4H susbsequent to the commencement of vertical blanking rather than a period of 3H subsequent thereto, as for Fields I and II above described. Following these general patterns and without changing in any way the color cycle of scanning the first line traced following the termination of vertical blanking and which line tracings are represented by the video signaling information depicted at 44 would be represented in green in the picture rather than red, which would have been the case had vertical sync occurred in its normal time relationship with respect to the first equalizing pulse. Consequently in scanning Field III the first line of the picture will be scanned in green and the lines following will be in the established color cycle. Referring back again to Fig. 4 it can be seen that the color selected for tracing line 2 of Field IV is red (rather than blue which had appeared for line 2 in Field II). This represents no color shift in the color scanning order, however, as can be observed. The vertical blanking period and the vertical sync deflection control provided by the signal series 45 occurs following precisely the same number of equalizing pulses as would the vertical sync signals for the third field represented by line 3. Accordingly, the first line of signal traced in the next field will be indicative of red.

Field V will be repetition of Field I. To achieve the color shift the vertical sync pulse series is shifted ahead one line period with respect to the field preceding. Consequently the scanning of the odd lines of Field V (commencing with line 1) starts so as to correspond precisely to Field I and is thus like line 1 so that if the first line is red, and assuming the color cycle to be red, green, blue, red, and so on, as above, the odd lines of the picture will again be as per Field I explained above.

Thus, to effect a single line shift in the pattern and provide a pattern traced of the type represented by Fig. 4, the block of six vertical sync pulses may be shifted back and forth within the group of equalizing pulses which start at the commencement of vertical blanking and end at a time period 10H thereafter. The period allotted to the leading equalizing pulses is in some instances 3H and in other instances 4H, with the period of trailing equalizing pulses under these conditions then being 4H and 3H, respectively. The long duration vertical pulses are always of the same time period (3H) but shift over a one line (1H) period within the 10H period.

If now a double shift is used to arrive at a pattern where each line of each picture or raster trace is scanned in all colors, it will be appreciated that some portions of the cycle will have to have the color scanning order advanced one line to produce one of the colors on one of the lines and advanced two lines (or retrogressed one line) to produce the same color on the same line even though it be at a later time period. For this purpose the period allotted between the commencement of the first leading equalizing pulse 47 within the vertical blanking time and the last equalizing pulse following the vertical sync pulses is lengthened into a period equal to 11H. To bring about a one-line shift of color or a two-line shift of color as the case may be, the group of six vertical equalizing pulses 48 is, as shown by Fig. 7, shifted as a group so that at one time the vertical sync pulses may be preceded by six equalizing pulses 47 and followed by ten equalizing pulses 49; at another time the six elongated vertical sync pulses 48 may be preceded by eight equalizing pulses 47 and followed by equalizing pulses 49 of the same number and, still further, for the third condition the elongated vertical sync pulses may be preceded by ten equalizing pulses 47 and followed by six equalizing pulses 49. In any case it amounts to a situation where control of the vertical deflection causes some individual color lines to be delayed, in effect, for a period of 1H or 2H, as desired.

Where the double color shift pattern is of the form shown by Fig. 5 the shift effect is somewhat similar to advancing the colors by a one-line period shift following each second field scanned. As an illustration of the condition it will be noted that the scanning pattern of Field I starts with line 1 in red, whereas the scanning of the same line in Field III is in a green color. The change amounts to a shift of one line ahead (or two lines back) in the color cycle or sequence (such as the red, green, blue, red, and so on) above suggested. Were there to be a zero shift, as per the pattern of Fig. 3, the lines of each field, e. g., Fields I, III, V and so on for the odd lines and Fields II, IV, VI and so on for the even lines, would always appear in like color.

This condition is brought about by the relative location of the six elongated vertical sync pulses 48, as in Fig. 7, with respect to the commencement of the vertical blanking period and the first of the leading series of equalizing pulses 47. An advance of one line is equivalent to a delay of two lines and therefore for illustrative purposes the advance has been selected.

The reverse would be equally true, however, so that by an appropriate control of the location in the vertical blanking period of the group of vertical pulses any desired pattern might be traced. Fig. 7 shows the color phasing pulses 50 which are of similar nature to those depicted at 41 by Fig. 6. The phasing pulses 50 serve to allocate one definite color to the particular line of scanning following this high frequency burst. The circuit to achieve these results will be more fully described in connection with the reference to Figs. 9, 10 and 11.

Referring to Fig. 8 for a moment, however, there is shown an expansion of the bursts of high frequency representing the phasing signal burst, such as shown at 50 in Fig. 7. The waveform of signal depicted at 51 is developed from a sine wave oscillator which will be referred to particularly in connection with the description of Figs. 9 and 11, although it will be noted at this time that the high-frequency pulse 50 (enlarged at 51), as shown, is not strictly sine wave due to a present inclusion in the operational circuit of suitable clippers through which the sine wave signal is passed prior to transmission. In Fig. 8 the waveform represented opposite the legend "serrated pulse" is illustrative of the fact that the high-frequency oscillator to produce the phasing signal burst passes through a reasonable number of oscillatory cycles each time the oscillator is keyed to a usefully operative state. The general relationship between this frequency and each of the horizontal and the equalizing pulses has been designated. Alternatively, the high-frequency energy burst represented in Fig. 8 at 51 might be replaced by elongated signal 52, as represented in the second line of Fig. 8 opposite the legend "wide pulse." The overall effect of such pulse reaching receiver instrumentalities is generally like that obtainable with the burst of high-frequency energy depicted at 51. In either instance the two forms of signal are reasonably independent of the amplitude at which they reach the receiver for good receiver functioning. They have good noise rejection features that do not disturb the operation of black-and-white receivers because the black-and-white receivers would have been caused to function and to be controlled as to rate of horizontal or line deflection by the leading edge of sync pulse immediately preceding the burst of high-frequency energy for the wide signal pulse. The receiver functioning with either form of color phasing signal will provide substantially precisely accurately controlled color representations.

Serrated or high-frequency burst of signals 51, or even the wide signal pulse 52, might be replaced by a notched form of signal, such, for instance, as that disclosed by the U. S. patent application Serial No. 121,861 of George E. Sleeper, Jr., above mentioned. Or, a suitable pulse for the control purpose might be sloped at its rear edge, for instance, or such a sloped pulse might be combined with a notched pulse so that the pulse has the characteristics of both the notch and the sloping rear edge. Such signal formations also would be reasonably independent of amplitude but would have a lesser degree of noise rejection than would those waveforms depicted by Fig. 8. Neither form of signal would have any substantially deleterious effect upon black-and-white receiver operation. The cost of operating circuits to select signals of this character would be only relatively minor and of the same general price range as those which will be described as particularly applicable for the signal wave formations of Fig. 8.

Considering now circuits particularly applicable for producing and controlling color shift signals of such form that the elongated vertical sync pulses provide the color selection, reference may now be made to Fig. 9 of the drawings. In this connection it is to be noted that the unit diagrammed and pictured by Fig. 9 is intended for combination and use with more or less standardized forms of synchronizing signal generators which will produce the waveforms standardized for present television transmission methods. As such, and illustratively, such components may be considered as applicable to and suitable for inclusion in television synchronizing generator equipment such as that described in connection with the camera equipment, Type TK–30A, manufactured by Radio Corporation of America, Camden, New Jersey, of which the field synchronizing generator equipment is illustratively known as the Type TG–10A.

Under these circumstances the input signal at the input terminal 54 is a pulse repeated at the field frequency of 60 cycles per second, the pulse being of relatively short duration compared to the 1/60-second field period. The pulse is usually of a duration something less than 63.5 microseconds (approximately the time required to scan one line of 525-line, 30-frame per second picture). The diagram of Fig. 9 represents a block form showing of apparatus suitable for controlling the signal formation such as to produce zero shift, single color shift or double color shift. Accordingly, the input pulse at terminal 54 may be fed to all of a two-line delay multivibrator 55, a one-line delay multivibrator 56, and a gate 57. The two-line delay multivibrator 55, in turn, feeds its output to a gate 58 which is controlled in its operation in a manner later to be described by one output obtainable from a gate multivibrator 59. The one-line delay multivibrator 56 feeds its signal output to the gate 61 which is controlled in its operation by one output obtainable from the gate multivibrator 62 which receives its control signal from the second output of the gate multivibrator 59. Each of the gates 57 and 61 supplies outputs to still another gate 65 which latter element is controlled by the second output signal from the gate multivibrator 59. The output signals from the gate 58 and the gate 65 are supplied to a terminal marked D of a switch 66. The gate 57 also supplies its output to the terminal S to be contacted by the arm of switch 66.

Input signals arriving at terminal 54 are also available at the terminal point "O" to be contacted by the arm of switch 66 when it is in position "O." At such time the input signals pass around the gate 57. The output signals from the gate multivibrator 59 are also available to the terminal "D" to be contacted by the switch arm 67 forming a part of the path to feed the signal into the gate multivibrator 62 in one of the switch positions. Within the gate multivibrator, as diagrammatically represented by the switch 68 and the contacts represented, provision is made to shift between double, single and zero shift. The switch unit 68 is permanently ganged with the switch arms 66 and 67 so that all three move in unison. Depending upon whether zero shift, single or double shift of the pattern line traces is desired, switch arms of the switches 66, 67 and 68 are upon the contacts "O," "S" or "D." For convenience of consideration of the operation the waveforms appearing in connection with this operation are depicted in connection with the circuit diagrams of Figs. 10 and 11.

At this point in the description reference may well be made to a portion of the particular circuit shown by Fig. 10. Such reference will be for the purpose of furthering the explanation of the functioning operation of those components above described as a part of Fig. 9. For convenience of reference, the so-far described components will be termed the "vertical shift circuit."

Referring to Fig. 10 for circuit components like those so far described, the incoming input pulses at terminal point 54 are fed to the two-line delay multivibrator which, for ease of reference, may be considered as the tube 55' (in considering components of this nature and to identify the components with corresponding elements of Fig. 9, elements such as multivibrators will have the tube components as far as reasonably convenient bear similar or related numbers to the components of Fig. 9, although of course it is to be understood that the circuit components depicted, for instance, by Fig. 10 are, of necessity, included within the blocks designated in Fig. 9). The incoming signals are applied, as above pointed out, in approximately the waveform indicated adjacent terminal points 54 in Fig. 10, so that the signal pulse itself extends into the negative polarity direction.

The multivibrator tube 55′ is so connected that the grid of the left-hand section is normally held somewhat positive relative to the cathode by reason of its connection to the source of plate supply voltage available in the conductor 101, with the connection being made through the resistor 102 and the potentiometer 103. This causes the tube normally to tend to draw current, so that the plate potential of the left-hand section is reduced from its plate supply potential, with the result that through the condenser 104 a potential which is negative relative to its previous state is applied. The grid of the right-hand half of the multivibrator tube 55′ is held below cut-off by the time constant of the condenser 104 and the resistors 105–106 which serve as the leak for the condenser. This state is maintained until the right-hand half of the tube conducts, when the plate potential then effective is transferred through the condenser 107, to the grid of the left-hand of the tube. A cycle of oscillations is thus maintained, subject, of course, to the input control pulse at terminal 54.

The time constant of the condenser 107 and the resistor combination 102–103 is such as to provide a pulse having a width equivalent to two black-and-white lines. The time constant of the condenser 104 and the resistors 105 and 106 is such that the grid of the right-hand half of the tube 55′ is held negative relative to the cathode for a period longer than 1/60 second. If now a signal or pulse input is caused to appear at the terminal point 54, this pulse is applied through the resistor 108 and the condenser 109 in the negative sense through the condenser 107 to the grid of the left-hand half of the tube 55′. The result is that temporarily this left-hand half of the tube is driven to a substantially non-conducting state, and the potential effective at the grid of the right-hand half of the tube is adequate to cause current to flow through that part of the tube. Consequently, a pulse extending in the negative direction is available at the right-hand plate. While the pulse applied at the terminal point 54 is of relatively short duration, and occurs at a rate of 60 cycles, in one form of operation the pulse amplitude may be of the order of 100 volts. Amplication occurs through the left-hand half of the tube, with the result that a voltage of amplified form is available to control the operation of the right-hand half of the tube. It can be seen from what has been explained that there is available at the plate of the right-hand half of the tube 55 a pulse extending in the negative direction. At the plate of the left-hand half of the tube there is a pulse extending generally in the positive direction, as shown by the waveform. This pulse is then transferred by way of the conductor 110 to the cathode 111 of the gate tube 58′. This tube is also supplied with a gating pulse from the multivibrator 59, which will be explained further in connection with Fig. 10.

The same pulse which is applied at the terminal point 54 is also supplied to the multivibrator tube 56′ in a manner substantially similar to that described in connection with the two-line delay multivibrator 55 and the tube 55′ thereof. The operation of the multivibrator tube 56′ is generally similar to that described for the tube 55′. It may be considered that the signal from the terminal 54 is applied through the resistor 112 and the condenser 113, to be effective through the condenser 114 to control the grid potential on the left-hand half of the tube. This left-hand half of the tube, in turn, controls the operation of the right-hand half of the tube by reason of the connection of the condenser 115 having the leak resistors 116 and 117 connected between the grid and ground, as was explained in connection with the multivibrator tube 55′. Normally, positive bias is applied to the grid of the left-hand half of the multivibrator tube 56′ by reason of the connection to the positive voltage line 119 through the resistors 120 and 121. The output pulse available at the left-hand half of the tube 56′ is supplied by way of the coupling condenser 122 to the cathode 123 of the gating tube 61′. There is also supplied at this tube, as will later be explained, a further control pulse which is derived from the gating multivibrator 68.

Lastly, it was pointed out that the incoming pulses at terminal 54 were also supplied to a gate 57 which produced no delay. For convenience of operation, the gates 61 and 57 shown by Fig. 9 will be embodied within a single tube, as has been shown by Fig. 10 by the tube 61′. The left-hand half of tube 61′ forms the gate 61 of Fig. 9 and the right-hand half thereof forms the gate 57 of Fig. 9. Likewise, as has been explained in connection with Fig. 9, one output from the gate 57 and the output from the gate 61 are fed to a further gate 65. For convenience of operation and for tube economy, the tube 58′ may have its right-hand half function as the gate 58 and its left-hand half function as the gate 65. In this form it can be seen that the combined output from the gate tube halves has the left-hand half connected to the one-line delay multivibrator 56, while the right-hand half derives its signal directly from the incoming signal pulse at the terminal 54. Similarly, the output of the tube 61′, as available at the plate or anode elements, is applied by way of the conductor 125 to the cathode element of the zero delay and one-line delay section of the gating tube 58′ through the coupling condenser 126 (the left-hand half of the tube 58′ functions as the gate 65 diagrammed in Fig. 9). The operation of these circuit components is such that the general form of pulse energy available at the outputs is somewhat like those waves depicted by Fig. 12. It can be assumed that the input wave available at terminal 54 is the wave (*a*) of Fig. 12. The output from the two-line delay multivibator which is shown at the output plate of the left-hand half of the tube 55′ may be considered as the negative pulse shown by Fig. 12 by the waveform (*c*), delayed with respect to the applied pulse corresponding to waveform (*a*). The one-line delay pulse which is available at the output of the left-hand half of multivibrator tube 56′ and which is supplied to control the one-line delay section of the gate 61′ is schematically represented by the waveform (*b*) in Fig. 12. The drawing schematically shows the time of the various wave sections with respect to each other.

It was explained above in connection with Fig. 9 that the gating multivibrator 59 serves to control both the gate 58 of the two-line delay circuit and the gating multivibrator 62, whose output, in turn, controls each of the gates 57 and 71. To this end the gate multivibrator 59 as shown by Fig. 10 comprises a pair of tubes 130 and 131, of which the former is a double triode and the latter is a double diode. The triode tube 130 is connected essentially as a multivibrator of the general type above explained. It has its output as available at the plate of the left-hand section supplied through the conductor 132 to the cathode of the left-hand half of the gating tube 58′, with the connection being made through the resistors 133 and 134. Accordingly, with the output of the multivibrator tube 130 extending alternately positive and negative, with the duration of each section measured by the time constant of the multivibrator circuit, the gating tube 58′ may have its left-hand section pass current at times when there is coincidence between the negative pulse supplied to the cathode of the tube 58′ through condenser 126 from the one-line delay and the zero delay gating tube 61′ and the negative portion of the wave output from the gating multivibrator tube 130. Similarly, the right-hand half of the multivibrator tube 130 is connected by way of the conductor 136 and the resistors 137 and 138 to the cathode of the right-hand half of the gating tube 58' so that at times when the gate of the right-hand half of the tube receives a negative pulse from both the two-line delay multivibrator tube 55' and the multivibrator tube 130, current will be passed through this portion of the tube.

The multivibrator tube 130 is controlled in its operation by a gating tube in the form of the double diode 131. The multivibrator tube 130 as it is connected is generally of a type such that once an operation is initiated it is maintained. If, for instance, the left-hand half of the multivibrator tube 130 were to be drawing current, the plate potential thereof would be reduced, with the result that the potential effective at the plate of the right-hand half of the double diode tube 131 would also be reduced from what it would be if the full voltage of the positive supply source connected through the conductor 141 were to be available. Consequently, under the assumed condition, and due to the fact that the tube 130 is connected as a multivibrator, it is apparent that if the left-hand half of the tube draws current, current will not be drawn by the right-hand half. Under this assumption the plate or anode of the right-hand half will assume the potential of the positive supply source connected in the conductor 141. The result is that this same potential becomes effective at the plate or anode of the left-hand half of the double diode. Also, it will be noted from the connection shown that the cathodes of each half of the double diode 131 connect together. Positive bias is applied through the resistor 142, so that generally neither half of the double diode tube 131 can draw current. If, however, a control pulse is applied to the double diode tube cathode through the conductor 143 and a condenser 144, it is apparent that if this potential is in the negative sense and of sufficient amplitude to overcome the positive bias on the double diode cathode for the assumed state of operation, the left-hand half of the double diode will conduct. The result is that the potential there effective is transferred through the condenser 145 to the grid of the left-hand half of the multivibrator tube 130 and current flow in this half of the tube is interrupted. Where the condition opposite that assumed above takes place, the right-hand half of the multivibrator tube 130 will draw current. The receipt of a negative control pulse impressed by way of the conductor 143 is such as to cause the right-hand half of the double diode 131 to draw current. Consequently there would be transferred to the multivibrator condenser 146 connected to the grid of the right-hand half of the multivibrator tube 130 a negative potential sufficient to interrupt the current in this half of the tube. This multivibrator is generally a synchronized free-running type of circuit. The particular form of circuit shown as comprising the tube 130 and 131 is a general variation of the arrangement depicted on page 166 of the publication entitled "Waveforms" by Chance, Hughes, MacNichol, Sayre and Williams, forming vol. 19 of the "Radiation Laboratory Series" published by McGraw-Hill Book Co., Inc., New York, 1949. Reference may be made to the aforesaid text for further description. The particular form of signal generation, and the particular waveform applied, will be referred to at a later point in this description in connection with the description of the buffer amplifier, first with respect to Fig. 9 and later with respect to this Fig. 10. With the gating multivibrator 59, comprising the tube 130 and the control double diode 131, functioning in the general manner explained, it will be apparent that a signal output therefrom serves to control the operation of the gate 58, both with respect to its control on the output of the two-line delay multivibrator 55 and the gate 65 and with respect to its control of the output from the one-line delay multivibrator 56 as passed through the gate 61 and the output of the gate 57.

The output signal from the multivibrator tube 130, as controlled by the double diode tube 131 above described, is also supplied (for double shift operation, with the ganged switches 66, 67 and 68 connected in the positions "D" indicated on the drawing for double shift operation) through the switch arm of the switch 67 and the contact point D and the capacity element 151 to the cathodes of the double diode tube 152, with the connection being through the conductor 153. As was above explained for the operation of the double diode tube 131, the cathodes which are tied together are normally maintained positive relative to ground by way of the connection through the conductor 153 and the resistor 154 to the source of positive voltage in the conductor 141. Accordingly, the double diode 152 normally does not draw current in either half, as was also explained in connection with the tube 131. The plates of the double diode 152 connect by way of conductors 155 and 156 to the plates of the left- and right-hand halves of the multivibrator tube 157, which again is a unit which operates substantially like the tube elements above described at 130. The arrangement of the multivibrator tube 157 is such that one half of the tube (that is, the left-hand half as shown) tends to draw current by reason of the connection of its grid element through the resistors 158 and 159 to a second source of positive potential appearing in the conductor 161. This again produces a condition similar to that explained above with respect to the tube 130, of which the grid in the left-hand section was normally held slightly positive by reason of the connection between the indicated resistor elements to the source of positive voltage available in the conductor 141.

Under the assumed conditions, it will be apparent that with the left-hand half of the multivibrator tube 157 drawing current, the right-hand half of the tube will be blocked by reason of the connection of the multivibrator condenser 162 to the plate of the left-haad half of the tube. Of course, under these conditions, the plate of the left-hand half of the tube has its potential relative to ground reduced by reasons of the current flow through the tube half. The result is that the plate or anode of the right-hand half of the double diode 152 assumes a like potential and, with the cathode biased positively, current does not flow in that half of the tube. Even though the right-hand half of the multivibrator 157 is not drawing current and the plate or anode thereof is at its maximum positive potential relative to ground and this potential is transferred to the plate and anode of the left-hand half of the double diode 152, the latter tube does not draw current in its left-hand half by reason of the positive bias applied to the cathode. However, for this assumed state of operation it will be evident that if a pulse or other control voltage is applied to the cathodes of the double diode 152 through the conductor 153, the left-hand half of the double diode will first draw current. Consequently, the change in potential at the left-hand plate of the double diode under such conditions would, of course, be transferred to the left-hand half of the multivibrator tube through the condenser 164. Current flow in the left-hand half of the multivibrator tube 157 is interrupted, but current commences to flow in the right-hand half of the double diode to operate at such times as a negative pulse is applied to the double diode cathodes.

The plate or anode of the right-hand half of the multivibrator tube 157 is connected by way of conductor 165 and resistor 166 to the cathode 123 of the gating tube 61'. Likewise, the plate or anode of the left-hand half of the multivibrator tube 157 connects through the conductor 167 and the resistor 168 to the cathode of the right-hand half of the gating tube 61. Accordingly, at time periods when pulses extending in the negative direction in either of the conductors 165 or 167 are applied by way of condenser 122 to the cathode 123 simultaneously with a negative pulse on the conductor 165, it is apparent that the left-hand half of the gating tube 61' will draw current. The resulting negative potential at the plate is then applied by way of conductor 125 and the condenser 126 to the cathode of the left-hand half of the second gating tube 58'. Likewise, the negative input pulses which are available at the terminal 54, when applied through the condenser 169 to the cathode of the right-hand half of the gating tube 61' concurrently with the application of a negative pulse to this cathode through the conductor 167, cause current to flow in the right-hand half of the gating tube 61'. The resultant voltage available at the plate also is transferred through conductor 125 and condenser 126 to the cathode of the left-hand half of the gating tube 58'. This pulse functions to control that portion of the operation in which there is zero delay or one-line delay of the input signal as it leaves the tube. The gating of the gating tube 58' under the control of the outputs from the multivibrator 130, as controlled by its associated double diode 131, has already been explained. Also, it has been pointed out that if the pulses applied from the multivibrator combination are in the negative sense with negative pulses concurrently applied to the left-hand cathode of the gating tube 58', current will flow in the left-hand half of the tube. Likewise, if the pulses applied from the two-line delay multivibrator 55' by way of conductor 110 are negative on the cathode of the right-hand half of the gating tube 58' simultaneously with the application of controlling voltages by way of conductor 136 from the multivibrator 130, there will be an output from the right-hand half of the gating tube 58'. This output then is made available on the conductor 173 connecting to the terminal point 174 of the switch 66. Such signals are then supplied to a further multivibrator unit 175, which will be termed a "pulse forming multivibrator," and which will form a part of a so-called pulse stabilizer.

At this point the description of Fig. 10 encompasses all of the so far presented generalized description presented with respect to Fig. 9. Recapitulating in order to set forth the operation still further, those waveforms shown by Fig. 12 generally indicate the signals available at various points in the system, even though the Fig. 12 waveforms are largely schematic. More precisely accurate waveforms are shown at various points in the circuit of Fig. 10.

The controlling pulses available at terminal 54 are shown in Fig. 12 as the wave (*a*). The output from the two-line delay multivibrator available as a negative pulse on the conductor 110 is shown as the waveform (*c*). The output pulses available in negative polarity at the output of the one-line delay multivibrator and which are used to control the left-hand half of the gating tube 61' are represented by the pulses (*b*) in Fig. 12. The control pulses (later to be described in detail and controlled from input source 201) which are supplied by conductor 143 to the controlling diode 131 in the double shift operation are indicated by the waveform (*d*). The output from the multivibrator 130 as available at the right-hand plate, and which is fed both by way of the conductor 136 to control the gating tube 58', and by way of the capacitor 151 to control the double diode 152 is, upon receipt of the control pulses (*d*) on the double diode 131, a pulse in the negative direction, as indicated by the waveform (*e*). Since the multivibrator 130 is of such nature and has such a time constant as to provide the stated form of operation, the pulse extending in the negative direction is of half the duration of the pulse extending in the positive direction. The reverse pulse polarity from the multivibrator 130 is available at the plate of the left-hand half of the tube. This pulse is applied through conductor 132. It is represented by the waveform (*f*) of Fig. 12. It will be seen that waveform (*e*) turns negative in polarity coincident with the receipt of the first of the pulses (*d*). Likewise, the waveform (*f*) turns positive in polarity coincidentally with the receipt of the first of the pulses (*d*). The next succeeding pulse (*d*) received brings about the opposite state of operation of the multivibrator 130, so that pulses (*e*) and (*f*) are reversed in polarity. This pulse relationship and position is maintained according to the illustrated example for the time period coinciding with the receipt of two successive pulses (*d*) or, in other words, for a 1/30-second period, after which the conditions again reverse. The multivibrator 157, as above explained, is triggered under the control of the double diode 152, which is, in turn, controlled by the output from the multivibrator 130. The result is that when the multivibrator 157 is operated, wave outputs such as represented by the waveform (*g*) are available on the conductor 165. A waveform output such as represented by the wave (*h*) is available at the conductor 167. This waveform, it will be seen, is such that an operational state which drives the left-hand half of the multivibrator 157 down to a substantially non-conducting state comes about, so that the wave (*h*) is available. The multivibrator operates in its assumed state until a second pulse of the controlling wave in the same polarity is received, at which time the operation of the multivibrator 157 is reversed so that the wave (*h*) then extends in the negative direction, while the wave (*g*) extends in the positive direction, and continues to reverse in accordance with the control exercised by the wave (*e*).

Now, for the condition of double shift operation, the wave (*e*), when in the negative sense, will, if received on the cathode of the right-hand half of the gating tube concurrently with a pulse of waveform (*c*), cause the right-hand half of the tube to draw current. It can be seen from the diagram of Fig. 12 that the first period of coincidence of negative polarity pulses (*c*) and (*e*) corresponds to the second from the left of the pulses (*c*). Accordingly the first output pulse corresponding to wave (*c*) which is available from the right-hand half of the gating tube 58' occurs as indicated by the wave (*m*). After the first pulse from the left in the wave (*m*) is developed, the controlling wave (*e*) assumes a positive polarity until such a time that the fifth pulse (*c*) from the left in Fig. 12 is developed. At such time a second pulse in the waveform (*m*) is caused to be developed. This waveform is then applied by way of conductor 173 to the terminal 174 of the switch 66. However, since the output of the left-hand half of the gating tube 58' is also available at the terminal point 174 for double shift operation, it will be seen that if there is coincidence in the time of receipt of a negative polarity pulse of waveforms (*f*) and a negative polarity pulse applied to the left-hand cathode of the gate tube 58' through the condenser 126, there will also be other outputs available at the terminal point 174. The signal available in the conductor 125, representative of one-line delay and zero delay as obtained from the gating tube 61', now depends both upon the polarity of the waveform (*g*), which is available from the multivibrator 157, and the polarity of the pulses (*h*), which have been delayed one line. It can be seen by reference to Fig. 12 that the waveform (*g*) is in a negative sense at a time coinciding with the second, third and fourth pulses (*c*) from the left. The result is that three negative pulses, represented by the wave (*k*) are supplied, due to the control of the left-hand half of the gating tube 61'. Thus, if any of the pulses (*k*) which extend in the negative direction coincide with the negative portions of the waveform (*f*) on the gating tube 58', output pulses due to the one-line delay control will also be available at the terminal 174. These pulses are represented by the wave (*n*) of Fig. 12, where it will be seen that the waves (*k*) and (*f*) extend in the negative direction concurrently at time periods corresponding to the time when the third and fourth pulses (*b*), for instance, are received.

Lastly, output may be available at the terminal point 174, due to zero delay control. These signals, which are determined by the periods of coincidence of the waves (*h*) and (*a*) in negative polarity at the cathode of the right-hand half of the gating tube 61, will be as represented in waveform (*n*) by the pulses corresponding in time to the first, sixth and seventh pulses ($a$) available at the input terminal 54. The wave ($n$) is shown, thus, as a composite wave, due to the control exercised by the zero and one-line delay functioning of the gating tube 61'.

For summation purposes, the waveform ($p$) is indicated as that wave which is available at the terminal point 174, due to each of the waves ($m$) and ($n$). It, therefore, is the summation wave.

It should be noted in this connection that the pulses in the wave ($p$) are all of precisely the same shape and available at the pulse standardizer output. They are not uniformly spaced with respect to each other. The function of the shift circuit is to control, as will become apparent at a later point hereof, precisely the time when the vertical deflection is caused to occur, as was made apparent from the description of the waveform shown by Fig. 7. Accordingly, it can be seen that from time to time the vertical waveform is in its position with respect to the initial equalizing pulse, as represented by the wave ($p$).

If now single shift operation to produce a waveform which may be considered to have been illustrated by Fig. 6 is to be relied upon, the switch elements 66, 67 and 78 are all moved to the contact point "S." Under these circumstances, the output available at the terminal point 174 no longer can be supplied to the switch arm and therefore the final output signal is that signal which is available at the terminal 181. Consequently, the effect is as if the gating tube 58' serving to control in its left-hand half the combined output from the gates 57 and 61 of Fig. 9, and in its right-hand half the gate 58 of Fig. 9, can no longer control the operation. To the contrary, the output from the zero delay and one-line delay gating tube 61' is supplied by way of the conductor 182 to the terminal point 181, with the result that the operation is slightly modified.

The pulse which is applied along the conductor 143 and through the capacitor 144 to the cathodes of the double diode 131 is now, for the condition of single shift, also supplied by way of the conductor 182 to the terminal point 183, upon which the arm of switch 67 rests. Under these conditions the incoming negative pulse in the conductor 143 will then be sufficient to control the operation of one or the other halves of the double diode tube 152. Control of the operation of the multivibrator, of which the tube 157 forms a part, is thus established. Operation of the multivibrator 157 under the influence of the double diode 152 is, for single shift, determined by the signal pulses in the conductor 143 derived through the contact point 183 for the switch arm of the switch 67. This is in contrast to the control from the output of the multivibrator 130. Likewise, for the single shift operation, the switch 63 and the therewith associated switch 185 are moved from the contact points "D" to the contact points "S." This shift in position of the switch arms on the contact points serves to connect different values of the resistors between the conductor 161 and the grids of each half of the double triode type of multivibrator tube 157. The tube operation is thus established by the selected time constants.

It might be pointed out particularly at this point that these grid resistors, such as those designated at 158 and 159 for the left-hand half of the multivibrator tube 157 for a condition of double shift operation, function, at least insofar as the resistor 159 is concerned, for instance, in such a way as to avoid excessive capacity loading on the tube. It also serves as a current limiting element. The other resistors similarly positioned with respect to each half of the tube 157 function in a similar manner.

For conditions of single shift operation, the switch components 187 and 188 will be moved from the contacts "D" to "S," as indicated. For this condition the potential available on the conductor 161 for double shift operation which is made available on the conductor 189 is still available by reason of the joining of the switch contact points "S" and "D."

For zero shift operation, still further changes become effective because the switch arms of all switches 66, 67, 187 and 188 are moved over to the contact points "O." There is no connection in this operational state to provide for controlling the multivibrator 157 between pulses on the conductor 143. Also, no provision is made for applying any biasing voltage on the grids of either half of the tube 157. Likewise, for conditions of single and zero shift, changes in the operating voltages for various tubes in the system are provided. For all conditions of operation plate voltage for the tubes so far discussed is applied from the terminal point 190 by way of conductor 191 and the conductor 192. Under a state of double shift operation each of conductors 161 and 141 receives operating voltage through the switches 187 and 188, since the switch arms connect through conductor 193 to receive the input plate voltage from the terminal 190. Thus, all tubes in the system which have been discussed above in connection with the vertical shift circuit, namely tubes 55', 56', 61', 58', 131, 130, 157 and 152, receive plate voltage from one or the other of conductors 141 and 161. Tubes 131 and 130 connect to the conductor 141 and tubes 157 and 152 have their plates connected to the tube 161. The tubes 55' and 58' have their plates energized from conductors 101, which in turn connect by way of conductor 194 with conductor 141. The tubes 56' and 61' have their plates connected to the conductor 119, which connects by way of the conductor 195 to the conductor 161. Thus, for double shift operations, it will be seen that all tubes above named can have their plates supplied from the terminal point 190 through one or the other of the conductors 101, 119, 141 and 161. However, for single shift operation the conductor 141 is no longer connected with a positive input voltage source at the terminal 190, because the arm of the switch 188 is moved over to the contact point S. This change in connection removes the plate voltage from the double diode 131 and the multivibrator tube 130. It also removes plate voltage from the multivibrator tube 55' and the double diode 58' Other tubes of the system, namely 56', 61', 157 and 152 now receive plate voltage by reason of the fact that the switch arm of switch 187 connects to its contact points "S."

Accordingly, all units functioning only with double shift operation are rendered inoperative when the switches are moved to the single shift position "S."

Similarly, as a condtion of zero shift operation comes about, the movement of the switch arms 187 and 188 to the contact points "O" immediately removes operating voltage from all of the tubes above discussed. It thus renders the already-described portion of the system concerned with double and single shift inoperative, except for the fact that the input pulses which appear at the input terminal 54 are transferred through the conductor 199 to the switch point "O," whereupon the switch arm of switch 66 comes to rest. Output voltages are then applied to the grid of the left-hand half of tube 175 in the same manner as would have been the case had the switching operation not occurred.

The arrangement thus described accordingly functions to provide flexibility in the type of synchronizing signal utilized, because shifting the position of the control switches between the terminals "D," "S" and "O" determines whether double shift, single shift or zero shift operation has been provided. Thus, the form of synchronizing waveform transmitted to receiving points is determined.

Mention has been made above of the control pulse supplied to the conductor 143 for the purpose of triggering the multivibrator tubes 130 and/or 157 by way of the double diodes 131 and/or 152. The pulses from which the control voltages on the conductor 202 are developed are supplied at the input terminal point 201 from a field puse-shaping unit of the form customarily provided in the television field pickup equipment described in the publication of Radio Corporation of America, Camden, New Jersey, identified as IB-36014, and particularly by Drawing W-308120 thereof. This is represented by the output of the tube V-30 which is available at the normally conducting plate of a multivibrator unit used to set the control of the equalizing pulses in the synchronizing generator. These pulses are fed from the terminal 201 by way of the conductor 202 to control the operation of an amplifier unit formed of the double triode tube 203. The supply pulse is through the resistor 204 and grid condenser 205 to the left-hand grid of the said double triode. Resistor 206 provides the usual grid leak to ground.

Incoming pulses at terminal 201 are provided in positive polarity and cause current flow in the left-hand half of the double triode 203. The result is that the plate of the left-hand half of tube 203 which is supplied with voltage from the conductor 192 drops in its potential with respect to ground. The pulse accordingly developed is transferred by way of the capacitor 207 which forms a differentiator with resistor 208 so as to reach the grid of the right-hand half of the double triode tube. When the grid of the right-hand half of the double triode 203 is caused to draw current on one edge of the applied differentiated pulse (the trailing edge in this instance) it results in the potential effective at the plate of its right-hand section decreasing relative to ground during this period of time. Consequently, a negative pulse is transferred by way of the thereto-connected conductor 143 for triggering the double diodes 131 and 152, depending upon whether double or single shift respectively is being used to control the operation of the system.

The tube 203 connected as shown functions accordingly as a pulse amplifier. It amplifies the pulse applied at the terminal 201 and causes this pulse to control in the manner specified the operation of the system. A second control signal is also derived from the output terminal of the right-hand half of the tube 203. This pulse is connected through the conductor 210 to a second output terminal 211, which carries its signal to the so-called color sync chassis. The pulse there available is used to control the gate multivibrator tube 220 to be described particularly in connection with the showing of Fig. 11. The generalized operation is apparent by reference to the gate multivibrator unit 221 in Fig. 9.

Referring back now to the showing of Fig. 9, the amplifier buffer 222 is shown as receiving its input or control pulse from the terminal point 201, which coincides with the already-described terminal point of like number in Fig. 10. The amplifier depicted at 222 corresponds to the double triode 203 of Fig. 10. The output conductor there shown at 143 supplies the signal to the gate multivibrator unit 59 of Fig. 9 which includes the components controlled and identified by the double diode 131, the double triode 130 and the associated circuit elements. Output signals from the tube 203 also feed, as indicated, by way of the conductor 210 in Fig. 9 to this gate multivibrator tube 220 which, for illustrative purposes in Fig. 10 is indicated as included in the rectangle 221.

Still continuing the reference to Fig. 9 for purposes of explanation, the signal waveform applied by way of the conductor 225 represents that signal which is derived at the contact arm of the switch 66, depending upon whether the contactor is shown as "D" (for double shift), "S" (for single shift) or "O" (for zero shift). Accordingly, this waveform may be a series of pulses which varies somewhat in spacing, as is represented by the waveform *p* of Fig. 12.

The pulses supplied in the conductor 225 are then fed by way of the resistor 226 and the capacitor 227 and thence through the capacitor 228 to the grid of the left-hand half of the multivibrator tube 175. This grid is normally biased in the positive sense, due to voltage applied from the positive voltage source 190 supplied through conductors 192, 141 and 229 to the positive bus bar 230. From this point the positive voltage is applied to the left-hand grid of the tube 175 through the two resistor elements 232 and 233. As is evident from the description which has preceded this and from the waveform (*p*) of Fig. 12, these control pulses are in the negative sense and serve to cut off the left-hand half of the multivibrator tube 175.

Referring back now to Fig. 9, the signals applied by way of the conductor 225 to the multivibrator 175 are fed as output waves to a gate mixer unit 235 which is also supplied with another control signal. The control signal so applied is developed by the application of input pulses at the terminal point 236, which feed to a clipper unit 237. The input pulses available at the input terminal 236 are derived from a field pulse former unit of the type customarily used and supplied for the television field pickup equipment, and particularly that equipment which is described in the instruction book published by Radio Corporation of America, Camden, New Jersey, known as IB-36014. The specific waveform there developed is shown in Fig. 47 and Drawing No. T-618734 as being developed at the pin 5 of the plug J-1, and is in the form of a 31,500-cycle pulse. This pulse waveform is developed at the output of a clipper producing the 31.5 kc. voltages for use in development of the equalizing pulses from the sync generator unit. The pulse waveform appears at terminal 236 and is fed through a high-impedance cable and connector into a clipper unit 237 whose output signals are further amplified in an amplifier unit 247.

As already mentioned, the pulses applied to the multivibrator 175 are fed in amplified form to the gate mixer 235. Concurrent with this operation, input pulses supplied at the terminal point 236, which represent untrimmed 31.5 kc. output pulses from the sync signal generator (for a 525-line picture repeated at the rate of 30 frames per second) are supplied to the clipper 237, and the output therefrom is supplied to the amplifier in the form of a pair of triodes (or a double triode) 247.

The output signals from the amplifier 247 are then supplied to the input of the gate mixer, conventionally represented at 235 in Fig. 9. In this form of arrangement the output pulses from the multivibrator 175 are preferably applied as a control signal upon one of the grids (this may be the outer grid of a mixer tube) and output signals at 31.5 kc. as derived from the amplifier 247 may then be fed to the inner grid of the gate mixer tube 235.

Output signals from this tube are then supplied to a terminal point 249, which connects to the pulse shaper unit. These signals connect to the normal inputs through a small coupling capacitor and a resistor of the vertical-driving multivibrator and a vertical-pulse-delay multivibrator in the sync generator (not shown). This procedure prevents jitter in the vertical pulses due to variation in height, width, or spacing in the shifted trigger pulse.

While this is happening this same stepping pulse is applied to the input of the gate multivibrator tube 220 for the purpose of its control. The pulse is in the conductor 210 and is applied to the terminal point 211 as in Fig. 11. The gate multivibrator 220 functions to select one and only one of the 5,250-cycle horizontal pulses from the series. The output signals developed from this unit are applied to a gate tube 255 to which there is also supplied the output signal from a phase inverter 257, later to be described. The gate tube 255 controls the phase inverter tube 259, which is so arranged as to permit operation to be controlled under the control of the trailing edge of the applied pulses. The phase inverter output is supplied then to a further gate multivibrator tube 261, whose output is supplied to control the operation of a gate 262. The gate is also supplied with energy of a selected frequency such as a one-megacycle substantially sine wave signal as developed by an oscillator 263, which may be of the crystal controlled variety to insure stability of oscillator frequency. The oscillator frequency is fed to the gate 262 along with the output of the multivibrator unit 261 applied thereto so that under the control of the multivibrator pulses the gate 262 will permit preselected cycles of the high frequency of the crystal oscillator to pass beyond the gate. The gate output is preferably supplied to a clipper element such as a crystal diode, which, for example, may be of the 1N34 type, and eliminates generally background effects in the signal. The gate 262 already mentioned, functions to pass the oscillator frequency such as the one-megacycle oscillations of the mixer-controlled oscillator 263. This control may be established within precisely determined limits through the driving multivibrator. The crystal 264 passes its clipped output to the phase inverter 266 which functions generally as a polarity inverter only. This output is then fed into a suitable mixer unit 268, which will be discussed further in connection with the description of Fig. 11 and its operation. An input sync pulse is also supplied to the mixer at terminal 270 from a low impedance source. The output from the mixer 268 is then superimposed on the signal at the terminal output point 269, from which a suitable output sync is available.

The remaining components of the color sync generator, schematically shown by Fig. 9 and in further detail by Fig. 11, comprises what may be termed a color horizontal driving pulse circuit. First making general reference to Fig. 9, this unit has applied to it at the input terminal point 272 the input pulses which occur at line frequency of 15,750 cycles per second, constituting the horizontal driving pulses from the pulse shaper for a 525-line picture which is reproduced at the rate of 30 picture frames per second. This signal input is supplied both to an amplifier unit 273 and to a gate unit 27. The amplifier output is applied both to a scale-of-three delay type multivibrator unit 275 and to a plurality of line amplifiers 276, whose outputs terminate, preferably, in 75-ohm impedances. The 15,750-cycle horizontal driving pulses for the already-described standard form of picture of 525 lines reproduced 30 frames per second are obtained at these low impedance terminal output points 277.

The scale-of-three delay multivibrator has its output operating to control a gate multivibrator 278, which, in turn, feeds its output along with the incoming 15,750-cycle pulses already determined to be present at terminal point 272, to the gate 274. Output signals obtainable at the gate 274 are then fed to a clipper unit 279 and thence through a suitable phase inverting unit 257 whose output supplies the gate 255 hereinabove discussed and described.

Similarly, the output from the phase inverter 257 feeds through further line amplifiers 281 and, by reason of the fact that the 15,750-cycle pulses applied at the terminal point 272 have been reduced in frequency by the scale-of-three multivibrator unit 275, output pulses at a frequency of 5,250 cycles per second are available at the output terminal point 282 across a 75-ohm output impedance. Such an output frequency is usable for the assumed deflection frequency for a system of the type above described in connection with the hereinabove-mentioned pending application wherein the scanning beam is caused to traverse at the transmitter in sequence areas of the mosaic target of a camera tube representative of all of red, green and blue, for instance, and to traverse at the receiver the areas of an image reproducing tube divided into strips of fluorescent material, which fluoresce to produce the image in all of red, green and blue in successive strips, as the scanning beam moves from one edge of the tube target to the opposite edge. The foregoing form of tube, however, is purely illustrative of one form which the invention may assume, since naturally the invention is fully applicable to tube arrangements of such types that the scanning cathode ray beam will be directed in its successive lines of deflection to develop target areas to produce successive lines in different colors, whether those areas be juxtaposed or be such that the scanning beam in tracing different color areas traces different paths above and below paths already traced for a like purpose.

The control arrangement described is also applicable, of course, to a camera tube arrangement wherein three separate image tubes are used. Such an arrangement would provide one tube for each of the separate component color images and the scanning operation would occur in such a way that each of the tubes became sequentially operative. By the same token, if desired, multiple tubes could be used at the receiver end of the system to recreate separate component color images in sequence, although this is not usually to be preferred, due to reasons of simplicity. In any event, the flexibility of the system and apparatus herein set forth is to be noted, and the utility of the circuits herein described with respect to various forms of physical arrangements becomes a significant feature of the described invention.

If reference is now made again to the specific form of circuit illustrated by Fig. 10 the undelayed pulses occurring at a frequency of 31.5 kc. from the sync signal generator as applied to the terminal point 236 feed through the conductor 283 and the resistor 284 and condenser 285 to control the current flow through the left-hand half of the clipper tube 286, which is illustratively shown by the unit 237 in Fig. 9. The clipper tube 286 is essentially a combination of a diode and a triode, with the diode section being formed by connecting the grid and plate and the left-hand half of the tube together, and feeding the input signal to the cathode across the resistor 287, so that signals of negative polarity will cause current to flow through the left-hand half of the tube. The rectified signal output is applied to the grid of the right-hand tube half forming an amplifying section. Output signals are obtained across the output resistor 288 and fed through the coupling condenser 289 and the conductor 290 to the grid of the left-hand half of the amplifier 247 (see Fig. 9), which is represented in Fig. 10 by the tube 292. The tube 292 is in the form of two triodes, so that amplification may occur in each half. Output signals from the second half of the tube as obtained across the load resistor 293 thereof are supplied by way of the conductor 294, the capacitor 295 and the conductor 296, for instance, to the inner grid 297 of the gate mixer tube 298. A similarly functioning unit is represented also in Fig. 9 by the gate mixer 235. At the same time the gating tube 298 is controlled by signal output from the multivibrator combination formed from the tube 175, which has its operation controlled in accordance with the signals supplied through the conductor 225 as determined by the signal available at the switch 65 in accordance with whether the switch arm is in the position of double shift, single shift or zero shift. Thus, the multivibrator output signal when applied through the capacitor 299 to the grid 301 of the tube 298 will, when positive and of like polarity to the signals applied to the grid 297 from the switch 66, permit the tube 298 to draw current. Any resultant output signal is derived across the output resistor 302 and made available at the output terminal 249, as already explained above.

For the double shift operation this waveform corresponds generally to the waveform designated at (*p*) on the curves of Fig. 12; for single shift operation this is generally represented, for example, by the waveform (*y*) of Fig. 12; and the effect for zero shift operation is that the output available will be generally represented by the waveform (*a*) of Fig. 12, which corresponds to the waveform supplied at the input terminal point 54. The output at the terminal 249 connects through normal inputs, such as a suitable coupling capacitor and resistor (not shown) to the input vertical multivibrators in the pulse shaper of the sync generator.

Reverting now to the showing of Fig. 11, the signal pulses which are available for the output terminal 211 of Fig. 10 are supplied again to the terminal 211 of Fig. 11. These signals control the current flowing through the right-hand half of tube 220 by varying the potential on the grid element 310. They reach the tube through the conductor 311 and the capacitor 312. The tube 220 functions generally as a multivibrator. Its operation produces output voltages to control the operation of the gate tube 315, which tube was illustratively described as the component 255 in Fig. 9.

Thus, it is apparent that the gate tube 315 has applied to it not only the output of the multivibrator tube 220 which serves to select one and only one horizontal pulse of a series, but also the 5,250-cycle pulses derived from the output of the phase inverter 257. This signal source is represented by the tube 317' whose output is supplied by way of the conductor 318 and the capacitor 319 to the grid of the right-hand half of the tube 315. This tube half functions to gate in the horizontal driving pulses and operates as a cathode follower with respect to the left-hand half. Output pulses from the right half are applied through the capacitor 320 to control the phase inverting tube 321 and the current flow therein. As a practical matter, the phase inverter tube 321 may be half of a double triode combination, of which the second half may be the tube constituting the phase inverter represented by the unit 266 of Fig. 9, and of which the half illustrated at 321 in Fig. 11 may constitute the phase inverter unit 321 of Fig. 9 (and tube 346, later to be described, in Fig. 11). Tube 321 is so arranged and set up that it operates on the trailing edges of the impressed pulses so that no interference occurs between any of the color sync and the line sync pulses. This insures further stability of operation. The inverted phase pulses appearing in the output of tube 321 are then supplied through the condenser 322 to control the grid of the left-hand section of the tube 323, which forms a multivibrator unit generally depicted by the diagrammatic showing at 261 in Fig. 9. This tube is of such characteristic that it functions generally to set the width of the high frequency burst. Output signals are derived on the conductor 325 by connecting to a junction point between the resistors 326 and 327, which together function as a voltage divider.

As is shown by the diagrammatic representation in Fig. 9, the gate multivibrator tube 323 has its output, as obtained at the output conductor 325, supplied to control the inner grid 326, for instance, of the gating tube 327. There is also supplied the gating tube 327 and on the outer grid 328 thereof oscillations from an oscillating tube schematically represented at 329. Oscillations of a frequency set by the selected parameters of the oscillator tube 329 and the therewith used circuit components are available at the grid 328 by reason of connection through the capacitor 330. The oscillator tube 329 has the oscillating tank circuit 331 comprising the shunt connected inductance 332 and capacitance 333 included in its output circuit. The oscillation stability is established by reason of the crystal control provided in the control circuit by the crystal 335. Feedback is provided in well-known manner by way of the well-known capacity 337 between the plate and the grid. Operating plate voltage for the oscillator is supplied by way of the conductors 338 and 339, as well as the resistor 340 and is derived at the oscillator tube plate through the tank circuit 331. In the form of arrangement herein illustrated the oscillating frequency of the crystal controlled oscillator tube 329 is generally set at approximately one megacycle for purposes of convenience.

At time periods when the tube 327 is gated to an operative state by reason of the signals applied through the conductor 325 to the inner grid 326, bursts of oscillations at the oscillation frequency of one megacycle are derived at the output of the gating tube across its load resistance through the capacitor 345. These outputs are fed through a crystal diode 264 (such as a 1N34 germanium alloy crystal) to control the operation of the phase inverter tube 346 which is schematically represented on Fig. 9 by the unit 266. The crystal diode 264 serves as a clipper. It generally has its cathode held at a positive voltage relative to ground by the two resistor elements 348 and 349 connecting crystal cathode between the high voltage conductor 350 and the ground connection point. It will be apparent that the resistors 348 and 349 together form a voltage divider at the crystal cathode as indicated. The voltage division is such that some positive bias is applied in the crystal cathode element. Accordingly, clipping of the impressed sine wave occurs, although the general characteristics of the output wave from the oscillator are reasonably well maintained.

The clipped signal output from the crystal diode 264, after passing through the phase inverter tube 346 is then supplied on the control grid 351 of the mixer tube 353 from which point the resultant output signal as derived across the load resistor 354 is obtained through the conductor 355 at the output terminals 269 and 270, as described in connection with Fig. 9. Accordingly, in accordance with the signals serving to control the mixer 327, bursts of high frequency oscillations become available at the sync output terminal 269 during each vertical blanking period.

At the terminal point 270 signals of the black-and-white supersync waveform are available from the pulse shaper output of the sync signal generator (not shown). These supersync waveform signals then may be mixed or added to the output of the mixer tube 353. Such mixer tube output signals are in the form of high frequency bursts lasting for time periods determined by the signal output from this mixer. The high frequency bursts from the oscillator 321 are applied to the grid 351 of the mixer tube across resistance 360 which may be of the order of one megohm, purely by way of example. The effect is that these burst signals may be combined with the supersync signal wave existing at the terminal 270. The supersync signal wave source has not herein been shown in detail, since it originates in a standard form of generator unit used to produce supersync signals of the black-and-white variety. Combined signals including the burst signals are available at the terminal point 269. Waveforms which illustratively represent this type of signal may be found by referring back to the showings of Figs. 6 and 7 particularly. Various operation parameters may be selected. The output signals feed across a rather low resistance element 361 and through a high resistance 363 to the terminal point 269.

Horizontal driving pulses as applied at the input terminal 272 are fed through the conductor 375 to the grid of the left-hand half of the double triode amplifier tube 273' through the coupling condenser 376 for amplification. The same signals are also fed through the coupling condenser 377 to the right-hand grid of the gating tube 274' as was diagrammatically indicated in the showing of Fig. 9 and the function of which will be later more fully expressed. The signals as amplified in the amplifier tube 273' are applied after amplification in one stage, that is, in the left-hand half, for instance, by way of the conductor 379 to feed a plurality of parallelly connected amplifier tubes 381, 382 and 383 which were conventionally represented as the line amplifiers 276 of Fig. 9. The signals supplied to the amplifier tube 273' which is shown as a two-stage amplifier, after having been amplified in the left-hand half of the tube, are also passed through the coupling condenser 384 to be supplied to the right-hand half of the tube for further amplification and phase inversion. As so amplified those output signals are then supplied to control operation of a scale-of-three delay type multivibrator such as indicated at 275 in Fig. 9, and which is shown on Fig. 11 as including the double triode tube 385.

The signal waveform available at the output of the right-hand half of the tube 273' and which appears across its load resistor 387 is a series of pulses extending in the negative direction (corresponding to the polarity of the impressed pulses at the input terminal 272), and which occurs at the line frequency rate of 15,750 pulses per second (pulse separation approximately 63.5 microseconds) to feed through the coupling condenser 388 and the decoupling resistor 388' to the grid condenser 389 of the right-hand half of the scale-of-three delay multivibrator 385. The resistor 390 and the potentiometer 391 serve to control the time constant of operation of the right-hand half of the tube. At the left-hand half of the tube there is a grid condenser 393 and the time constant of operation of this portion of the tube is determined by this condenser and the leakage path provided by the resistor 394 and the potentiometer 395. Potentiometers 391 and 395 function as pulse-width and period controls respectively.

As the incoming pulse signals are supplied it will be appreciated that the output signals obtainable from the multivibrator tube 385 depend upon first the timing of the input pulses applied and second the ratio of the operating characteristics of the two tube halves and the relationship between the period of the multivibrator and the repetition rate of the triggering signal. As the system is constituted this combination is such that frequency division of the order of three to one is possible within the tube with the result that every third incoming pulse developed at the output of the right-hand half of the tube 273' triggers the right-hand section of the scale-of-three multivibrator 385. Consequently the signal developed at the plate of this right-hand half of the tube 385 to be passed through the coupling condenser 397 is a series of pulses with each individual pulse spaced from the other by a time period of 3H, where H is the time between successive pulses of the input pulse energy applied at the input terminal 272 and occurs at the line frequency rate of 15,750 pulses per second for a black-and-white 525-line picture repeated 30 frames per second. These signals are then fed to a gate multivibrator conventionally represented in Fig. 9 at 278 and shown in Fig. 11 as the tube 398. The input signals are supplied through the condenser 397 to control the grid of the right-hand half of the multivibrator tube through the grid condenser 399 so that with the signal available at the output of the right-hand half of the scale-of-three delay multivibrator 385 having pulses appear at one-third black-and-white line frequency (pulses separated by a period of 3H), the supplied pulse tends to cause current to flow in the right-hand half of the multivibrator tube 398. It is worth mentioning that the signals used to control the multivibrator 398 drive it from the trailing (delayed) edge. This prevents multilating any pulses gated in the stage to follow. Triggering occurs at the reduced rate of once each 3H period and the resultant output pulses are applied through the coupling condenser 411, the decoupling resistor 412 across grid resistor 413 to one grid of the mixer tube 274'. It was already pointed out that the incoming line frequency pulses applied to the terminal 272 feed to the right-hand grid of the tube 274'. The pulses applied from the multivibrator units 385 and 398 are applied to the grid of the left-hand half of the tube 274' with the result that at the plates of the tube, which plates are connected together, there appears the addition of the two series of pulses, as indicated. This pulse series is in general a wave consisting of relatively long-duration pulses separated from each other by a period of 3H and to this is added a series of pulses repeated at a rate of H. Consequently, on every wide pulse the narrow pulse occurring at frequency H appears on a pedestal formed of the wide pulse. In order to derive from the combination the pulses occurring at a frequency of 5,250 cycles (one-third the black-and-white line frequency), the composite wave developed across the output resistor 417 of the combined halves of the tube 274' and which appears in the conductor 418 must be clipped by a suitable clipping tube. For this purpose the output signals in conductor 418 are fed through the coupling condenser 419 to the grid of a clipper tube 420, which is appropriately biased to clip at the indicated point so that across the output resistor 421 thereof pulses occurring at the 5,250-cycle rate, or, in other words, pulses separated by a time separation of the order of just slightly greater than 190 microseconds, are derived. These pulses are then supplied to a pair of parallelly-connected phase inverter amplifier tubes 317 and 317', which, in turn, are connected to suitable line amplifiers to be distributed to various points in the system.

The outputs from these phase inverters as shown in the diagram connect each to a pair of parallelly-connected line amplifier tubes 425 and 426 for the phase inverter 317 and 427 and 428 for the phase inverter tube 317'. Signal output from each of these output amplifier tubes is available at independent output terminals 429, 430, 431 and 432, and for the system herein being described these pulses occur at a frequency of 5,250 per second. The signal output of the amplifier 273', which in its left-hand half provided an amplified output signal appearing in the positive polarity and occurring at the line frequency of 15,750 pulses per second, is fed in parallel to the plurality of line amplifier tubes 381, 382, 383, already described, so that at the output terminals 434, 435 and 436 pulses are available at the already-described line frequency.

The result is that at the output terminal 269 above described there is available for combination with the normal signal output from the sync signal generator of standard form (not shown) the high frequency burst signals. At the other terminals, such as 429 through 432, driving pulses occurring at the frequency of 5,250 cycles are developed and at the last-named terminals 434 to 436 there is available the standard line frequency driving pulse occurring at the frequency H. In the instance shown, for long duration vertical signals the waveform at the terminal 269 will then be of the waveforms indicated by any or all of the schematic representations of Figs. 6, 7 and 8 hereinbefore described.

The conditions described above were to show the more complex (double shift) operation as illustrative of the system. If reference is made to the condition where the various switches 66, 193, 117, 67 and 115 are set for single shift, the waveforms of the outputs at various points of the system are slightly different in some respects from those obtained with the arrangement of Fig. 10, when the switches are upon the double shift operating points D, as above. For instance, the incoming pulse applied at the terminal point 54 is similar in both cases. Therefore the waveform (*a*) of Fig. 12 may be regarded as illustrative. Likewise, with the one-line delay multivibrator 56' being included in the circuit at this point, the output available between the capacitor 122 and the cathode of the left-hand half of the double diode 61' is represented by the waveform (*b*) of Fig. 12.

Even in conditions for single-line shift, the current flow through the left-hand half of the double diode 61' is controlled not only by the waveform (*b*) applied to the left-hand half of the tube, but is also determined by the voltage available in the conductor 165, which is represented as the waveform (*g*). The opposite polarity waveform, as represented as the waveform (*h*), serves to control the wave through the right-hand half of the tube 61'. This corresponds to an energization of the gate 57 (see Fig. 9) under the control of the incoming signal pulse. The waveforms available at the outputs of the multivibrator tube 157 are represented by the curves (S) and (T) of Fig. 12. While the gate section constituting the right-hand half of the tube 61' is operatively included in the circuit to pass signals the control pulses fed thereto comprises both the negative polarity pulses available at the terminal point 54 and also those signals appearing at the plate of the right-hand half of the double triode 157 as represented by the waveform of signal (*h*). The output wave of this tube is represented by the wave (*v*) shown by Fig. 12. It is determined by the periods of coincidence of the waves (*s*) and (*a*), as in Fig. 12, or, in other words, it is determinable by the periods when the waves (*t*) and (*a*) simultaneously extend in the negative direction to cause the double diode to pass current. The waveform which is available at the output of the one-line delay gate section constituting the left-hand half of the tube 61′ is determined by the voltage represented at (*b*) in Fig. 12, as it controls the current flow through this half of the tube in the presence of the waveform (*g*) on the cathode. When the waves (*b*) and (*s*) of Fig. 12 each extend in the negative direction concurrently then current will flow through half the double diode tube 61′ to produce the waveform represented in (*w*) of Fig. 12.

Likewise, the signal available on the conductor 182 due to no delay in the signals is determined by periods of coincidence in the negative sense of the waves (*b*) and (*s*), or, in other words, is represented by that voltage designated by the curve (*w*) of Fig. 12. The waves (*v*) and (*w*) of Fig. 12 are then applied to the terminal contact point 181 and are represented on Fig. 12 as the waveform (*x*). This waveform, when passed through the mixer tube 298, appears as shown by the wave (*y*) of Fig. 12. It will be seen that the second and third pulses in the negative direction are delayed by a period of H with respect to the first pulse and that then the fourth and fifth pulses as pictured are coincident in time with the fourth and fifth pulses along line (*a*). By the time the sixth and seventh pulses along the line (*y*) are traced, it will be seen that again these pulses are delayed delayed by a one-line period with respect to the pulses shown in line (*a*) of Fig. 12, and representing those pulses applied at the terminal point 54.

For a zero-line delay period, of course all of the tubes 55′, 56′, 61′, 58′, 131, 130, 157 and 152 are rendered inoperative, and therefore the output pulses available at the terminal point (O) of the switch 66 to be fed to the pulse forming mutivibrator tube 175 will be precisely of the form of those pulses indicated at terminal points 54 of Fig. 10.

The foregoing thus describes the change in the pulse formation of the waves supplied at the terminal points (D), (S) or (O) of the switch 66 for energizing the pulse-forming multivibrator tube 175 of the pulse standardizer. It will be seen that the exact wave formation used to control the system operation depends upon whether or not zero shift, single shift or double shift is being utilized.

The signals generated with the sync generator equipment described in the preceding figures, when transmitted and accompanied, for instance, by the video signals representative of the several component colors of the polychrome representation, may be received in various forms of receiving instrumentalities. Among the many forms of receiver circuits which may be utilized for this purpose, one which has been operated in connection with this type of apparatus is a television receiver of a type and style manufactured by Radio Corporation of America, which is known as the Model 9PC41. In this model receiver the general video, audio and synchronizing circuits therein disclosed have been utilized. In connection with this type of reception, for instance, the video signal input which is obtainable at the cathode output of the video amplifier tube identified in the aforesaid receiver circuit as the V–113 (not shown herein) is applied to the input terminal of the circuit herein represented in Fig. 14. In this form of circuit arrangement of Fig. 14, the composite signal is applied at the terminal 451 so that the applied synchronizing signal component is of positive polarity on the conductor 452. This signal then is applied through the coupling condenser 453 and across the resistor 454 to the grid of the left-hand half of an amplifier tube 455. This tube generally operates in an unbiased state due to connection of the tube cathode to ground as indicated. The output from this left half of the tube 455 is derived across the load resistor 456 and is applied through the condenser 457 to the crystal diode 458 in such a direction that signal output from the left-hand half of the tube which causes the voltage at the plate thereof to be reduced tends to cause current to flow through the crystal diode 458. This diode may be of various forms, but one form which has proven satisfactory in use is that known as the 1N34 germanium alloy crystal. The diode has positive bias applied to the cathode element thereof across the voltage divider provided by the resistors 459 and 460, with the resistor 459 connecting to the conductor 461, to which positive voltage from a source not shown is applied. The result is that the crystal diode 458 tends to provide clipping of the incoming signal voltage in that the positive bias applied is in such direction that clipping of the received signal results.

Consequently, there is applied to the right-hand half of the double diode 455 across the resistor 461, which forms the output resistor for the diode and the grid resistance of the tube 455 a voltage which tends to reduce the current flow in this half of the tube. Consequently, the resultant signal appearing across the output resistor 462 in the right-hand half of the tube is of the measure of the input signal to the tube 451, with the video portion thereof removed. The resultant signal so developed is then fed through the capacitor 463 to the grid of the unbiased triode 464 with the signal applied across the leak resistance 465. Under these circumstances, signal voltages dependent upon the presence of the high frequency burst in the video composite signal available in the terminal 451 are developed. These voltages, when derived at the plate resistor 456 and when caused to flow through the tank circuit formed of the primary winding 457 of transformer 458 and the condenser 459 shunting this primary, cause oscillations to be developed in the tank circuit consisting of the transformer primary 457 and the condenser 459. The result of this is that during the periods of presence of the high frequency burst signals are developed from the keyed output of the crystal-controlled oscillator 329 of Fig. 11. The tank circuit is brought into substantial resonance, and may be tuned by the indicated adjustable slug tuner so that excitation of the primary circuit of the traansformer will cause oscillations to be developed in the secondary circuit consisting of the transformer secondary winding 462 and its shunting capacitor 463. The transformer primary and its shunting capacity are preferably tuned to a frequency coinciding with that of the oscillator 329 of Fig. 11. Consequently, at time periods when current flows through the tube 464, oscillations are developed in the tuned secondary circuit, consisting of the transformer secondary 461 and its shunting capacitor 463. The resultant signals are passed through the rectifier stage consisting of the diode 464 in such a way as to be rectified by this diode. The diode 464 has its cathode connected to the tank circuit and its anode connected to an integrating circuit consisting of the capacity 465 and its shunting resistance 466, which together are connected in parallel and form the input circuit of the triode 467.

The unidirectional pulse output from the rectifier 464 consists of a series of pulses of the frequency to which the tank circuit is tuned. This, incidentally, corresponds to the frequency of the oscillator 329 (see Fig. 11). Discrimination against noise in the system is had because of the selectivity of the tuned circuits 459, 457 and 462, 463 at the selected frequency. The tube 467 functions generally as a phase inverter amplifier to amplify the integrated output of the rectifier 464 and the output signal thus resulting is derived across the output resistor 468 and fed through the capacitor 469 to the grid of a clipper tube 470.

Bias on this clipper tube 470 is provided by way of the cathode resistor 471 and the serially-connected potentiometer 472. Plate voltage is obtained through resistance 473 connected to the source of positive potential applied on the conductor 461. Thus the bias applied in the cathode of tube 470, which may be varied slightly by adjustment of the potentiometer 472, serves to set the clipping level to which the incoming signal applied through the condenser 469 causes current to flow in this tube. The waveform of the voltage applied to the grid of the tube 470 is such that the peak resulting from the integrated output of the integrating circuit comprising the shunt-connected condenser 465 and resistor 466 cause current to flow in the tube 470 at peak periods with the threshold set by the established bias. Output voltages from the tube 470 as derived across the output resistor 474 are supplied through the coupling condenser 475 and the decoupling resistor 476 to the grid of a tube 478. This tube is normally biased positively by connection of its grid to the source of positive potential on the conductor 461 by way of the resistor 479. Accordingly, while the tube 478 functions mainly as a phase inversion amplifier, it also functions in such a way that the voltage effective at its plate across the output resistor 481 is in a positive sense during periods when the high frequency burst is derived from the tuned tank circuit consisting of the inductance 462 and the condenser 463. Thus, during these periods, there is transferred to the amplifier tube 483 through the differentiating circuit comprising the differentiator condenser 484 and its leak resistor 485, a pulse which tends to cause current to flow through the tube 483. This occurs when the pulse overcomes the bias applied thereto upon its cathode by way of the resistor elements 486, which connect at one terminal to the source of positive potential on the conductor 461 and at the other terminal to the cathode, and to the cathode resistor 487, which connects to the minus (ground) side of the positive potential source (this may be slightly minus, or at a ground potential, as is evident). The pulses cause current to flow in the tube 483 and there is derived across the output resistance 489 through the condenser 490 a potential in the negative sense which is applied to the cathode element 491 of a diode rectifier 492. The cathode of this diode is normally maintained positive by reason of the voltage divider connected between the conductor 461 and ground, or the negative terminal of the voltage supply source. This voltage divider is provided by the two resistor elements 493 and 494. The diode element 492 is connected through tube 483 so that it is in shunt to the storage condenser 495 forming part of the counter circuit later to be described. It is apparent that at time periods when the diode 492 is brough to a conducting state by reason of a pulse applied through the condenser 490 the positive bias of the cathode 491 is overcome through the voltage dividers 493—494 so that any charge applied in the condenser 495 will be removed.

In the operation of the television receiver, as was above pointed out, the electro-optical image representations may be produced in color upon the luminescent target of a cathode ray tube which is swept by a cathode ray beam modulated under the control of incoming video signals. This tube has the beam deflected in horizontal or line direction by a suitable electromagnetic deflection coil or electrostatic deflection plates, or both, as was schematically represented by Fig. 2. Likewise, the beam is deflected in a vertical, field, or frame direction by a second electromagnetic coil or by electrostatic means, as was also schematically indicated in Fig. 2. The scanning beam developed within the tube is caused to move in its field pattern by well recognized methods and means under the control of each vertical deflection pulse series, such as those represented, by way of example, in Figs. 6 and 7 by the wave portions 29, 36, 42 and 45 for the single-shift method of Fig. 6, and by the wave portion 48 and so on for the double-shift form of transmission depicted by Fig. 7.

As an illustrative example of the type of target area which may be traced by the beam in its scanning, it has been assumed hereinabove that the end wall target of the tube may consist of three juxtaposed areas upon which luminescent compounds adapted to produce light under the impact from an electron beam in each of red, green and blue (assumed primary or component colors of an additive color system) are located. With this system, if the three target areas are traced in sequence the scanning beam will trace its first line over, say, the red area, the second over the green area, and the third over the blue area, all by way of example. While this will be a representation of three successive lines of a color picture, it will represent only one lateral or line-scanning traversion of the assumed type of image reproducing tube. Accordingly, for relating the color-scanning operation to the black-and-white standards now in effect, namely 525 lines of picture reproduced in a 2:1 interlace relationship at a 30-frame per second repetition rate, the scanning beam must move in such a way that it moves from top to bottom in a 1/60-second period, and yet moves laterally across all of the red, green and blue light image producing areas in a period which is three times as long as that for one sweep laterally for black-and-white. In other words, although this rate of lateral motion is reduced to 5,250 sweeps per second, it will be apparent that each third of the image area is scanned in precisely the 1/15,750 of a second allotted for scanning one line of black-and-white with present standards.

It was pointed out above that one of the important advantages of the disclosure herein made was that not only would the shift in timing of the synchronizing pulses for controlling vertical deflection of the scanning beam offer an improvement and permit an adjustment of color shift, but also that the arrangement proposed would permit of the use of stabilized line deflection control which would insure stability of receiver operation. If the so-called "flywheel" type of line deflection circuit is adopted it can be appreciated that greater stability of line deflection occurs, and yet it is desirable that this form of control be such that proper phasing of the color cycle and of the receiver with the transmitter be permitted. To this end, in the receiver instrumentality of which a portion is schematically depicted by Figs. 14 it has been assumed that at the input terminal 501 pulses occurring at the frequency of 15,750 per second are obtainable. Purely by way of example and illustratively thereof, not in any limiting sense, pulses of such frequency are obtained in the use of the so-called "flywheel" type of synchronizing circuits which are used in the television receiver of the type known as the Model 9PC41 manufactured by Radio Corporation of America, Camden, New Jersey. Such pulses are developed at the plate of a horizontal oscillator tube which is generally of the tetrode variety and in which oscillations are developed between the cathode and screen grid, and the resulting oscillations are electron-coupled to the plate circuit. In one example of this type of arrangement the pulses in question are found at the plate of the tube V302 of the receiver type above mentioned.

It is, of course, apparent that other arrangements to produce pulses in the line frequency may be resorted to, and, for instance, such an arrangement might consist of a multivibrator which is synchronized under the control of the incoming line frequency synchronizing pulses. The precise manner of developing pulses occurring at the line frequency of 15,750 pulses per second is unimportant, and therefore the arrangement of the receiver Model 9PC41 is merely illustrative of one form of suitable device.

On the assumptions hereinabove made, the incoming pulses at a frequency of 15,750 cycles available at the input terminal 501 are fed through the condenser 502 to be impressed upon the plate 503 of a diode 504 and the cathode 505' and the second diode 504'. The cathode 505 of the diode 504 connects to one terminal of the storage condenser 495 with the other condenser terminal being connected to ground. The plate element 503' of the diode 504' also connects to ground. This combination of diode tubes operates in the fashion of a well-known step counter, with the condenser 502 made considerably smaller than the condenser 495. Accordingly, with the incoming pulses in negative polarity at terminal 501 the diode 504' conducts and condenser 502 is charged. On the other half of the input cycle the diode 504 is caused to conduct and the result is that a charge is placed into the storage condenser 495. This operation occurs in repetition for each cycle of the incoming sync input wave at the terminal 501, until the charge in the condenser 495 is of such magnitude as to cause the blocking oscillator tube 511, later to be described, to operate.

It was above mentioned that the diode 492 and the therewith associated tube 483 connect in shunt to the storage condenser 495. Also connected to respond to the level of charge built up in the condenser 495 is a blocking oscillator tube 511, which has its grid electrode 512 connected through the secondary winding 513 of transformer 514 and thence across the condenser 495. Feedback from the plate 515 of the blocking oscillator 511 to the grid occurs through the transformer 514, with the primary winding 517 being adapted to feed the output voltage to the grid circuit in substantially normal manner. Plate voltage for the blocking oscillator tube is derived through the primary winding 517 and the resistance 518 from the source of positive voltage connected to the terminal 461' on the conductor 519. It is interesting to note that the same source of voltage 461' is also supplied to the conductor 461, hereinabove discussed. A damping diode 521 and the therewith-associated condenser 522 may be provided for damping oscillations in the winding 517 of the transformer 514. However, it likewise can be noted that the diode 521 can be omitted from the combination without detrimentally affecting the general operation.

The blocking oscillator tube 511 has its cathode 523 biased positively by reason of the connection through the indicated variable tapping point to the resistor 524, which resistor is serially connected with the resistors 525 and 526. The entire series combination of resistors connects between the source of positive voltage in conductor 519 and ground. A condenser 527 forms a normal cathode resistor bypass. Such tube bias as is applied upon the cathode 523 on the tube 511 is such that a plurality of cycles of control pulses received at the terminal 501 will be required to place upon the grid 512 a positive voltage sufficiently high to overcome the biasing effect of the positive voltage applied to the tube cathode. Thus, each time a pulse is applied to the diode 504 from the input terminal 501 the condenser 495 is caused to charge in a general step-like fashion (e. g. see Fig. 15). The constants of the circuit are so set up that for the arrangement of the receiver where three lines of picture are recreated for each lateral sweep of the scanning beam, three incoming horizontal (line) frequency pulses are required to build up a voltage in the condenser 495 sufficiently high to trigger the oscillator tube 511, which functions as a monostable oscillator. Upon the attainment of a voltage in counter condenser 495 which is sufficiently high to overcome the effect of the cathode bias applied to the monostable oscillator tube 511, it will be apparent that the tube goes through one cycle of oscillation to produce a pulse at its output, after which it returns to an inoperative state. Conduction of current through the tube 511 causes discharge of the condenser 495 and until the condenser charges again to a potential sufficiently high to trigger the tube 511 the latter must remain in its inoperative state.

An equilibrium voltage is reached for each discharge of condenser 495 due to the diodes 504 and 504' operating in series so as to limit any negative voltage on the condenser. After the tube 511 has been triggered and a pulse of energy derived therefrom, this pulse is applied across the pulse transformer through the coupling condenser 531 to the grid of a further tube 532, which functions as a phase inverter. The output signal from tube 532 is a pulse in the proper polarity to control a horizontal discharge tube such, for instance, as the tube marked V304 in the already-mentioned RCA receiver Model 9PC41. Operation of the discharge tube (not shown) functions then to produce deflection of the scanning cathode ray beam within a cathode ray image reproducing tube in normal fashion, as if the operation were for black-and-white.

From what has been shown, it is apparent that the scanning beam developed within the cathode ray tube is caused to be deflected in a line pattern once for each three received line frequency synchronizing pulses, whether these line frequency synchronizing pulses be used to control a so-called flywheel type of synchronizing circuit or any other type, so long as the pulses are developed at the desired line frequency. Accordingly, the scanning beam will be moved with the arrangement herein described so that it sweeps not only vertically with respect to the tube target, but also laterally. Where the vertical pulses occur as described in connection with the showing of Figs. 6 and 7, for instance, the time of vertical deflection of the scanning beam will be such that the vertical motion occurs at what might be termed non-uniform periods. Thus, the color traced for the different lines of the picture pattern will shift, as already explained.

From what has been stated it likely will be appreciated that the color in which the successively traced lines will appear is determined at least in part by the operation of the vertical deflection circuit. However, if the receiver operation is not coordinated precisely with the transmitter as to color phase, the color in which each line at the receiver is scanned may not correspond with the color in which the corresponding line at the transmitter is analyzed. It is for this reason that, with the arrangement described in connection with the circuit components of Figs. 9, 10 and 11 and the waveforms particularly of Figs. 6, 7 and 8, emphasis is herein placed upon the production of ways and means properly to phase the line color and to relate the color at the receiver to an identical color at the transmitter. To this end, if the receiver operation is properly phased with the transmitter operation, the high-frequency burst such as represented, for instance, by the waveforms 32 and 41 of Fig. 6, 50 of Fig. 7, and 51 of Fig. 8, will follow immediately the time period at which the charge builds up on condenser 495 of the counter to an extent sufficient to trigger or operate the monostable blocking oscillator 511. Accordingly there will be impressed across the condenser 495 a low impedance discharge path in the form of the conducting diode 492 and the then conducting tube 483 which conducts whenever the phasing pulse is present. Ordinarily the oscillator has operated and condenser 495 has discharged immediately prior to the phasing pulse receipt. The result is that at such times no recycling of the monostable blocking oscillator occurs. If, however, phase coincidence does not exist between the time at which the monostable oscillator would normally be triggered under the control of the charge in the condenser 495 of the counter, it is apparent that the high frequency burst will occur early, for instance, in the cycle of three. Accordingly there will be placed across the condenser 495 by reason of the conduction of the diode 492 a low impedance path prior to the time when the condenser normally would be discharged by the monostable oscillator. Under such circumstances more than three pulses occurring at line frequency are required to trigger the monostable oscillator. Thus, since the triggering of the oscillator will be delayed by a time period coinciding with either a one- or a two-line period of a black-and-white transmission, this delay will coincide only to one or two color line delays of a line sequential color pattern. The effect is that of rephasing the color operation so as precisely to coordinate the receiver operation with that of the transmitter. After the phased operation is once established for one field of transmission the high frequency bursts occur in such relationship that, generally speaking, further recycling during the transmission is unnecessary. The high frequency bursts then occur to coincide with the normal deflection of the scanning beam in the vertical direction.

Operation of the system so far described may be regarded generally as being based upon a plan that zero or minimum charge in the condenser 495 is representative of one selected color, namely red. A charge to the first level will be representative of green, and to the second level will be representative of blue. Any further tendency to charge, of course, causes conduction within the blocking oscillator tubes and by the methods explained above reduces the condenser charge again to a zero or minimum level. The selection of colors representative of different charge levels is represented in this illustrative example by reason of the fact that at the camera tube for image analysis and at the receiver tube for image reproduction the color analysis occurs according to a color cycle red, green, blue, red and so on. Consequently, if it be assumed that the high frequency burst is such as to reduce the charge on the condenser 495 to a zero or minimum level each time it occurs, then it follows that the high frequency burst signal or any other appropriate form of rephasing signal functioning in a generally related manner constitutes a signal also indicative of red.

The general operation of the system described by Fig. 14 is schematically shown in one of its forms by Fig. 13, where the frequency-controlled source for developing the line frequency pulses has been represented at 451. This oscillator is connected to energize the step counter of the scale-of-three variety shown at 543. Output from the counter feeds at the terminal 545 to a suitable control of line deflection pulses, which, in the illustrated example of Fig. 14, is the monostable oscillator. The incoming signal pulses available at the input terminal 547 which may control the oscillator or other source indicated at 541 to produce the line frequency pulses feeds also to control the operation of a resonant circuit indicated at 549, and which corresponds illustratively to the double tuned R. F. transformer circuit 458 and 462 and 463 of Fig. 14. The output from the resonant circuit 549 is shown as controlling a triggering circuit represented at 551, which is indicated as controlling or modifying the operation of the counter 543. This thus can be considered as diagrammatic generally of the controlled diode element 492 serving to recycle the counter whose storage condenser is represented in Fig. 14 at 495.

The general type of operation last explained may further be understood and appreciated now by referring to the waveforms of Fig. 15, wherein wave (*a*) represents generally the synchronizing waveform during a portion of the vertical blanking cycle of one field of incoming signals. It will be noted, however, that for reasons of simplicity the waveform shown at (*a*) is represented in such a way that the peaks extend in the direction of the arrow representing maximum black (that is, blacker than blacker, or ultra black), while that portion of the wave designated by the line 553 represents generally black level in the picture. Curve (*b*) may be regarded illustratively as representative of the output derived from the resonant circuit 549 which, for instance, would be the waveform supplied from the resonant circuit 462–3 in Fig. 14 to the rectifying diode 464. The waveform (*c*) of Fig. 15 may be regarded as representing the control pulse which would be applied through the diode 492 to control the phasing of the circuit by reason of establishing the conductive period of the diode so as to make it effective to recycle the counter. Waveform (*d*) of Fig. 15 might, for instance, represent a stabilized source of line frequency oscillations which could be rectified to charge the storage condenser represented at 495 in Fig. 14. Waveforms (*e*) and (*f*) represent the charges placed on the counter circuit as a result of the locally-developed line frequency energy such as that of wave (*d*) and lines (*g*) and (*h*) represent the phase control pulses which are effective to recycle the counter. In this connection it may be noted that waves (*e*) and (*g*) are such that the system may be considered normally as operating in synchronism and in phase with the transmitter. The waveforms shown at (*f*) and (*h*) may illustratively be considered as representing conditions where the receiver system is out of synchronism and phase with the transmitter at the beginning of the indicated portion of the cycle, and is in phase and in synchronism at the end of the indicated portion of the cycle. In all parts of Fig. 15 the polarities indicated are merely illustrative, and arbitrarily chosen, and are not necessarily the particular polarities obtainable at the particular points in the system.

From what has been pointed out above it is thus apparent that the system operates in general so that the color cycle consists generally of N lines which are repeated, illustratively, in red, green and blue. There are also certain phasing and synchronizing signals which control this operation. A counter circuit is provided to control the deflection of the scanning beam to trace the color lines in the color cycle after N color lines are reproduced, and also there is provided in the system for reception described in each of Figs. 13, 14 and 15 a control of the phase of the operation such as to cause a response in a particular or specific color of the color cycle under the control of a selected signal waveform. This shift in control is accomplished through the recycling of the counter mechanism or its equivalent, which is used to control the deflection of the scanning beam in at least one of its directions, so that the color representation may be produced to coincide with the scanning operation at the transmitter.

It also will become apparent from the foregoing that the color phasing is established under the control of the high frequency burst signal following the various long-duration slotted vertical pulses. Such a burst signal has been depicted particularly by the diagrammatic waveforms of Fig. 6 for the so-called single shift and Fig. 7 for the so-called double shift. Fig. 8 represents a portion of a pulse of high frequency energy.

However, phasing operations may be obtained through the use of other forms of signals; for instance, by taking recourse to the form of slotted signal described in the above-mentioned copending applications Serial Nos. 93,122 or 121,861. Such a pulse may designate, for instance, a red line trace. Selection of the pulse may be provided by methods and apparatus described in the last-named pending patent applications. Also as is suggested by the arrangement of Fig. 8, a wide pulse may be used to accomplish results like those attained by the high frequency pulse. Under such circumstances, signal integration may be provided through an integrating circuit analagous to that shown by the condenser 465 and its shunting resistance 466. This, if necessary, may include a plurality of stages and may even include a plurality of shunt-connected capacity elements, each having one terminal grounded, for instance, and the other terminal separated by resistance elements functioning together if desired, with a terminating resistance. The significant factor is that regardless of the form of phasing pulse provided, the circuit operates and functions to make a selection of one particular color and utilizes that particular color to recycle or rephase the operation in the event that the color phase changes.

Although any schedule of tube components must be considered illustrative, the following represents a listing of tube types which have proven satisfactory for use in the apparatus described by Figs. 10 and 11.

| Tube number: | Tube type: |
|---|---|
| 55'; 56' | 12AU7 |
| 61'; 58'; 131 | 6AL5 |
| 292; 175; 130; 157 | 12AU7 |
| 298; 327 | 6L7 |
| 152 | 6AL5 |
| 203; 286; 329; 273' | 12AU7 |
| 353 | 6AG7 |
| 385; 398; 220; 315; 323 | 12AU7 |
| 274' | 12AX7 |
| 321; 346; 317; 317' | ½ of 12AU7 |
| 381; 382; 383 | 6J6 |
| 420 | 6AC7 |
| 425; 426; 427; 428 | 6J6 |
| Diode crystal 264 | 1N34 |

With respect to various condensers and resistors it will be appreciated that some tolerance in size is permissible. The various operating time constants to establish operation have been indicated both by way of explanation with reference to the circuit components and by the operational waves prepared. Likewise, the burst frequency herein assumed at one megacycle is purely illustrative value, since lower or higher frequencies can be caused to function equally satisfactorily.

While it has not been particularly stressed up until this point of this disclosure, the control effects are brought about during periods of vertical or field blanking. These periods were assumed to coincide with the vertical blanking normally experienced in operating black-and-white television transmitters and receivers. A method of operation utilizing such blanking periods is completely satisfactory insofar as the present invention is concerned. However, in cases where some refinements in operations are desired, and particularly so where periods of vertical blanking must be set to coincide with any specific number of line equalizing or field synchronizing pulses, as well as the phasing pulse therewith associated, it is possible either to lengthen or to reduce the vertical blanking period. Therefore, any consideration of this invention should be made with the thought in mind that the vertical blanking period within which the shift and phase control operations herein described are intended to occur may reasonably be of any appropriate length satisfactorily to permit the described functioning.

Likewise, the blanking may be shifted in its time of occurrence in a manner closely analogous to that in which the group of vertical synchronizing pulses herein described has been shifted. Thus the operation may be so established that the vertical blanking pulse duration may remain constant, but commence at different portions in the cycle, or the blanking pulse duration may remain of constant length and commence at like portions in the cycle, or the blanking pulse may be of variable duration, depending, of course, upon the particular form of shifting instantaneously to be accomplished. The significant factor is that the blanking period while not critical in its nature is nonetheless subject to control, even though the invention in its broadest sense does not reside in the precise form of the blanking signal, but rather in the control signals therewith associated.

Having now described the invention, what is claimed is:

1. In line sequential color television apparatus wherein video signals are developed for representing an image in polychrome by sequentially tracing successive image lines in the different colors of a polychrome color cycle, means to develop line synchronizing signals to synchronize line scanning operations, means to develop field synchronizing signals to control field scanning patterns following a selected plurality of line synchronizing signals to develop a polychrome image, means to shift the timing of the field synchronizing signals from field to field relative to a selected number of line synchronizing signals to shift the color relationship of the traced lines of the image relative to the scanned field position in the sequentially traced fields and means to develop a phasing pulse following in time relationship the field synchronizing signals to phase receiver operations with transmitter operations.

2. In line sequential color television apparatus wherein video signals are developed for representing an image in polychrome by sequentially tracing successive image lines in the different colors of a polychrome color cycle, a pulse generator to develop synchronizing signals occurring at line frequency to synchronize line scanning operations, means also to develop from the pulse generator field synchronizing signals to control field scanning patterns following a selected plurality of line synchronizing signals to develop a polychrome image, means to shift the timing of the field synchronizing signals from field to field thereby to shift at receiver points the color selected to represent different lines of the traced image, means to develop a color phasing pulse following in time relationship the field synchronizing signals to phase receiver operations with transmitter operations, and a combining circuit for forming all of the series of synchronizing, phasing and video signals into a composite signal series.

3. In line sequential color television apparatus wherein video signals are developed for representing an image in polychrome by sequentially tracing successive image lines in the different colors of a polychrome color cycle, means to develop line synchronizing signals to synchronize line scanning operations; means to develop field synchronizing signals to control field scanning patterns following a selected plurality of line synchronizing signals to develop a polychrome image; means to shift the timing of the field synchronizing signals from field to field relative to a selected number of line synchronizing signals to shift the color relationship of the traced lines of the image relative to the scanned field position in the sequentially traced fields and means operative at time periods following field synchronizing signals to develop a phasing signal for providing a phase control of line traces of the image at receiver points and to bring receiver scanning patterns into phase with the transmitter scanning operations.

4. In line sequential color television apparatus wherein video signals are developed for representing an image in polychrome by sequentially tracing successive image lines in the different colors of a polychrome color cycle, means to develop line synchronizing signals to synchronize line scanning operations, means to develop field synchronizing signals to control field scanning patterns following a selected plurality of line synchronizing signals to develop a polychrome image, means to shift the timing of the field synchronizing signals from field to field relative to a selected number of line synchronizing signals to shift the color relationship of the traced lines of the image relative to the scanned field position in the sequentially traced fields and means to develop following each field synchronizing signal a signal of sinusoidal character and of a time duration of the order of at least several cycles between successive line synchronizing impulses for providing a phase control of line traces of the image at receiver points and to bring receiver scanning patterns into phase with the transmitter scanning operations.

5. In line sequential color television apparatus wherein video signals are developed for representing an image in polychrome by sequentially tracing successive image lines in the different colors of a polychrome color cycle, means to develop line synchronizing signals to synchronize line scanning operations; means to develop blanking signals of a duration coinciding with a plurality of image line traces in excess of twelve, means to develop during the blanking interval field synchronizing signals to control field scanning patterns following a selected plurality of line synchronizing signals to develop a polychrome image with the said field synchronizing signals being initiated from field to field at times which change between the majority of fields in one color picture frame so as to effect color shift in scanning; means to develop also during the blanking period a phasing signal pulse of a long duration compared to that of each of the line synchronizing pulses for providing color phasing between transmitter and receiver scanning operations, and means for combining all of the signals into a composite signal series for transmission.

6. In line sequential color television apparatus wherein video signals are developed for representing an image in polychrome by sequentially tracing successive image lines in the different colors of a polychrome color cycle, means to resolve a polychrome image into a sequence of signals representing the image in its several component colors, each of such signal sequences being of substantially one-image-line duration, means to develop line synchronizing signals to synchronize line scanning operations; means to develop field synchronizing signals to control field scanning patterns following a selected plurality of line synchronizing signals to develop a polychrome image; means to shift the timing of the field synchronizing signals from field to field relative to a selected number of line synchronizing signals to shift the color relationship of the traced lines of the image relative to the scanning field position in the sequentially traced fields, means to develop color phasing signals following each series of field synchronizing signals, and means to combine all of the said signals to form a composite signal series for transmission.

7. In television receiver apparatus for line sequential color television wherein polychrome images are developed to represent in a sequence of image line traces different colors and in which the intensity in each color is modulated under the control of received video signals, means to establish the number of scanning lines per traced image under the control of received line synchronizing impulses; means to shift the color in which each line of the image is developed during each field under the control of the field synchronizing impulse producing a change in the number of scanning lines per image field; means for phasing the color image line representation with transmitter scanning operations under the control of phasing signal impulses, and means to maintain the visible window of the image reproducer in an unilluminated state during transition periods of switching between color values.

8. Television receiver apparatus for each of monochrome and polychrome line-sequential color shift reception comprising a substantially stable source for developing pulses at a frequency corresponding to desired line deflection frequency, a signal selection circuit for deriving synchronizing and phasing signal components from incoming composite television signals, a tuned circuit which is resonant at a frequency which is high compared to the line frequency repetition rate connected to respond to the selected phasing signal components and to produce output signals therefrom, a pulse developing circuit connected to respond to an integral number of locally developed line frequency pulses, a beam deflection control circuit to initiate a scanning beam deflection substantially coincidentally with each locally developed pulse, and a control circuit responsive to the signals produced from the tuned circuit output to recycle the pulse developing circuit once following a substantially constant number of the locally developed synchronizing signal components.

9. Television receiver apparatus for line-sequential color shift reception comprising a substantially stable source for developing pulses at a frequency corresponding to line deflection frequency, means for stabilizing the source under the control of received synchronizing pulses, a signal selection circuit for deriving color phasing signal components from incoming composite television signals, a tuned circuit which is resonant at a frequency which is high compared to the line frequency repetition rate connected to receive the selected phasing signal components and to produce therefrom output signals, a monostable oscillator for controlling the line deflection of developed television rasters coincidentally with oscillator output, a counter circuit responsive to the locally developed line-frequency pulses for triggering the monostable oscillator coincidentally with the development of an integral number of local pulses, a control circuit connected to receive the output from the tuned circuit and to recycle the monostable oscillator with shifts in the time of development of the tuned circuit output pulses with respect to the locally developed line-frequency pulses.

10. Television receiver apparatus for line-sequential color shift reception comprising a substantially stable source for developing pulses at a frequency corresponding to the line deflection frequency, a signal selection circuit for deriving synchronizing and phasing signal components from incoming composite television signals, a tuned circuit which is resonant at a frequency which is high compared to the line frequency repetition rate connected to be excited by the phasing signals, a pulse developing circuit connected to respond to the locally developed line frequency pulses and a control circuit responsive to the tuned circuit output to restrict the time of development of the pulses under the control of the tuned circuit to one during a substantial multiplicity of the locally derived synchronizing signal components.

11. Television receiver apparatus for each of monochrome and polychrome line-sequential color shift reception comprising a substantially stable source for developing pulses at a frequency corresponding to desired line deflection frequency, a signal selection circuit for deriving synchronizing and color phasing sync signal components from incoming composite television signals, a tuned circuit which is resonant at a frequency which is high compared to the line frequency repetition rate connected to respond to the selected phasing signal components, means to derive an output signal from the tuned circuit at time periods widely spaced with respect to the line synchronizing signals, a pulse developing circuit connected to respond to an integral number of locally developed line frequency pulses, a beam deflection control circuit to initiate a scanning beam deflection substantially coincidentally with each locally developed pulse, and a control circuit responsive to the signals produced from the tuned circuit output to recycle the pulse developing circuit once following a substantially constant number of the locally developed synchronizing signal components.

12. In color television apparatus of the line sequential type wherein images are analyzed and reproduced in a line scanning pattern in a manner such that successively traced lines of an image raster appear in a succession of colors of a selected color cycle, means for developing line synchronizing signals to indicate the time of completion of scanning each traced line; means for developing a blanking signal following a plurality of line scannings corresponding to a picture field; means for developing field synchronizing impulses during the field blanking interval; means for shifting the position of the field synchronizing impulses during the blanking period from time to time so that the traced fields include different numbers of scanning lines depending upon the number of line intervals intervening between any two successive vertical field synchronizing impulse series so that the color order of line scanning in said image fields is shifted; and means to develop during the period of blanking a phasing signal to establish color phase relationship of receiver operations with transmitter operations.

13. In color television apparatus wherein video signals are developed for representing an image in polychrome by sequentially tracing the lines of successive image areas in different colors of a polychrome cycle; a generator to develop synchronizing pulses occurring at a line frequency to synchronize line scanning operations; a generator to develop signals to synchronize field scanning operations following a selected plurality of line synchronizing signals; means to develop blanking signals coincidentally with each of the synchronizing signals and upon which blanking signals the synchronizing signals are superimposed; the blanking signal occurring coincidentally with the field synchronizing pulse occupying a time duration substantially longer than the field synchronizing pulse and commencing prior thereto and continuing subsequent thereto, the commencement of each of the field blanking pulses being uniformly spaced and each blanking period continuing for a like time duration; means to develop a color phasing pulse following the field synchronizing pulses in time relationship and serving to phase receiver operations with transmitter operations for color selection, said color phasing pulse being developed during the period of field blanking and means to shift the time of the field synchronizing pulses at selected recurrences thereof relative to the commencement of the field blanking pulse so that following periods of shift the video signal following the termination of field blanking shall be representative of a different component color than the similarly positioned video signal of the preceding field sequence.

14. Color television apparatus wherein video signals are developed for representing an image in polychrome by sequentially tracing successive image lines in different colors of a polychrome color cycle, means to develop line synchronizing signals to synchronize line scanning operations; means to develop field synchronizing signals to synchronize field scanning patterns following a plurality of line synchronizing signals; means to generate blanking signals coincidentally with each of the forms of synchronizing signals and to precede and follow each such synchronizing impulses by a blanking signal pulse; the blanking signal pulses occurring coincidentally with the field synchronizing pulses having been initiated prior to the field synchronizing pulse and continued subsequent thereto; means to develop a color phasing signal during the period of field blanking and following the field synchronizing pulses, the color phasing signal for one alternately repeating character of field commencing at regularly recurring time periods following the initiation of field blanking and the color phasing signals for the other alternately repeating field being initiated with a time difference from the other color phasing signals by substantially half the time period to trace a complete lateral deflection path for an interlaced pattern and means to shift the field synchronizing pulses relative to the commencement of the blanking pulses in selected fields of a color cycle to effect a change in the color in which like-positioned lines of the picture are developed.

References Cited in the file of this patent

UNITED STATES PATENTS

| | | |
|---|---|---|
| 2,296,908 | Crosby | Sept. 29, 1942 |
| 2,378,746 | Beers | June 19, 1945 |
| 2,389,646 | Sleeper | Nov. 27, 1945 |
| 2,515,613 | Schoenfeld | July 18, 1950 |
| 2,538,041 | Reeves | Jan. 16, 1951 |
| 2,566,764 | Fyler et al. | Sept. 4, 1951 |

FOREIGN PATENTS

| | | |
|---|---|---|
| 562,334 | Great Britain | June 28, 1944 |